(12) United States Patent
Anderson et al.

(10) Patent No.: US 11,238,340 B1
(45) Date of Patent: Feb. 1, 2022

(54) PREDICTIVE EYETRACKING USING RECURRENT NEURAL NETWORKS

(71) Applicant: Facebook Technologies, LLC, Menlo Park, CA (US)

(72) Inventors: Alexander Grant Anderson, Redmond, WA (US); Alexander Jobe Fix, Seattle, WA (US); Robert Dale Cavin, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 1117 days.

(21) Appl. No.: 15/802,333

(22) Filed: Nov. 2, 2017

Related U.S. Application Data

(60) Provisional application No. 62/437,278, filed on Dec. 21, 2016.

(51) Int. Cl.
| | |
|---|---|
| *G06N 3/08* | (2006.01) |
| *G06F 3/01* | (2006.01) |
| *G02B 27/00* | (2006.01) |
| *G06N 3/04* | (2006.01) |
| *G06N 3/02* | (2006.01) |
| *G02B 27/01* | (2006.01) |
| *G06T 7/292* | (2017.01) |

(Continued)

(52) U.S. Cl.
CPC ........... *G06N 3/08* (2013.01); *G02B 27/0093* (2013.01); *G06F 3/013* (2013.01); *G06F 17/18* (2013.01); *G06N 3/02* (2013.01); *G06N 3/049* (2013.01); *G06N 3/0445* (2013.01); *G06N 7/005* (2013.01); *G06T 7/292* (2017.01); *G02B 27/017* (2013.01); *G02B 2027/0147* (2013.01); *G02B 2027/0187* (2013.01)

(58) Field of Classification Search
CPC ...... G06N 3/049; G06F 3/013; G02B 27/0093
See application file for complete search history.

(56) References Cited

U.S. PATENT DOCUMENTS

| | | | | | |
|---|---|---|---|---|---|
| 6,025,608 | A | * | 2/2000 | Harris | H01L 29/1608 257/289 |
| 6,070,098 | A | * | 5/2000 | Moore-Ede | A61B 5/7267 600/544 |

(Continued)

OTHER PUBLICATIONS

Baluja et al. (Non-Intrusive Gaze Tracking Using Artificial Neural Networks, Jan. 1994, pp. 1-14) (Year: 1994).*

(Continued)

*Primary Examiner* — George Giroux
(74) *Attorney, Agent, or Firm* — Fenwick & West LLP

(57) ABSTRACT

A system predicts future positions or vergence depth of the user's eyes and generates gaze contingent content, such as for a head-mounted display (HMD), based on the predicted positions or vergence depth. The system includes an eye tracking controller that creates eye tracking information defining positions of a first eye and a second eye of a user over time. The eye tracking information is input to a neural network model that outputs the predicted positions or vergence depth. The predicted positions or vergence depth is then used to render the gaze contingent content, or to change other configurations of the HMD. Latency between the detection of user eye movement and the output of corresponding content is reduced to provide a more immersive real-time user experience.

15 Claims, 9 Drawing Sheets

(51) Int. Cl.
*G06F 17/18* (2006.01)
*G06N 7/00* (2006.01)

(56) References Cited

U.S. PATENT DOCUMENTS

| | | | |
|---|---|---|---|
| 2015/0220768 A1* | 8/2015 | Ronnecke | G06K 9/0061 |
| | | | 348/78 |
| 2017/0123492 A1* | 5/2017 | Marggraff | H04N 5/247 |
| 2017/0148215 A1* | 5/2017 | Aksoy | G06F 3/013 |
| 2017/0200266 A1* | 7/2017 | Podilchuk | G06T 7/11 |

OTHER PUBLICATIONS

Schneider et al. (An open-source low-cost eye-tracking system for portable real-time and offline tracking, May 2011, pp. 1-4) (Year : 2011).*

Campana et al. (An Artificial Neural Network That Uses Eye-Tracking Performance to Identify Patients with Schizophrenia, Jan. 1999, pp. 789-799) (Year: 1999).*

* cited by examiner

PREDICTIVE EYETRACKING USING RECURRENT NEURAL NETWORKS

CROSS REFERENCE TO RELATED APPLICATIONS

This application claims the benefit of U.S. Provisional Patent Application No. 62/437,278, filed on Dec. 21, 2016, which is incorporated by reference in its entirety.

BACKGROUND

The present disclosure generally relates to head-mounted displays (HMDs), and specifically relates providing gaze contingent content on HMDs.

HMD's generate displays that depend on user motion. For example, a scene presented by a display of an HMD may move with detected changes in the user's eye position to create an immersive virtual reality (VR) environment. Eye tracking refers to the process of detecting the direction of a user's gaze, which may comprise detecting the position or angular orientation of the user's eyes. However, there is typically a (e.g., processing, data communication, etc.) latency between eye tracking data detection and the corresponding gaze contingent content being output on the display.

SUMMARY

Techniques for compensating for latency between eye tracking information detection and gaze contingent content display are discussed herein. A neural network model that predicts the future state of a user's eyes is used to generate input for gaze contingent content rendering. Programmatic eye movement prediction is a challenging problem because of the complexity of human eye movements over time. A neural network is used to create the neural network model of eye movements. In particular, a recurrent neural network is used to generate "predicted eye tracking information" including future eye positions and the future vergence depth of the eyes based on using input eye tracking information of previous eye positions or other prior states (e.g., previous vergence depth, head motion, etc.). The input eye tracking information includes a sequence of measured eye positions and vergence depths, and thus can be used to predict the future state of the eyes at a future time (or timestep). The predicted eye tracking information is a predicted future state of the eyes, which is generated by the recurrent neural network based on analyzing the current state, and prior states of the eyes. The predicted eye tracking information is used as input for rendering the gaze contingent content for output to a display.

For example, some embodiments may include a system comprising: a head mounted display (HMD) comprising: an electronic display that outputs gaze contingent content in accordance with display instructions, a plurality of cameras configured to capture images of a first eye of a user of the HMD and a second eye of a user of the HMD, and an optics block configured to direct the gaze contingent content to respective exit pupils of the HMD corresponding to locations of the first eye and the second eye of the user of the HMD. The system further includes an eye tracking controller configured to: determine eye tracking information defining positions of a first eye and a second eye of a user using the captured images, and determine, based on supplying the eye tracking information to a neural network model, predicted eye tracking information defining predicted positions of the first eye and the second eye. The system further includes a console configured to: generate the display instructions using the predicted eye tracking information, the display instructions including content for presentation by the display, and provide the display instructions to the HMD. In various embodiments, the eye tracking controller may be part of the HMD, the console, or a remote machine (e.g., of a central system).

In some embodiments, the neural network model may include a recurrent neural network model. The neural network model may define an algorithmic relationship between the eye tracking information at first timesteps and the predicted eye tracking information at a second timestep subsequent to the first timesteps.

The location of the eye tracking controller within the system may vary. In some embodiments, the eye tracking controller is integrated with the console. In other embodiments, the eye tracking controller is integrated with the HMD.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
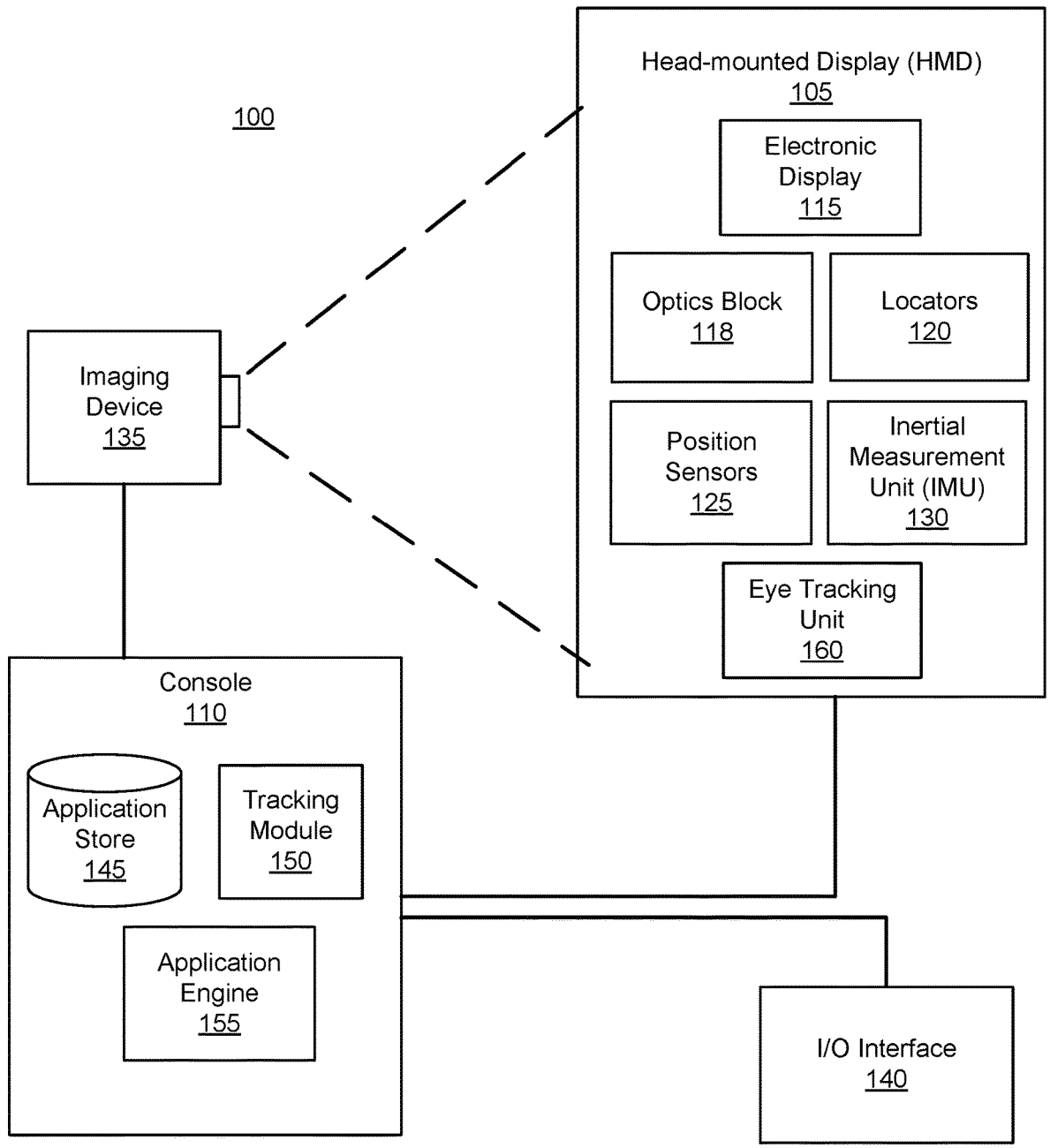
FIG. 1 is a block diagram of a head-mounted display system, in accordance with some embodiments.

FIG. 1 is a block diagram of a head-mounted display (HMD) system 100 in accordance with an embodiment. The system 100 comprises a head-mounted display (HMD) 105, an imaging device 135, and an input/output (I/O) interface 140 that are each coupled to a console 110. While FIG. 1 shows an example system 100 including one HMD 105, one imaging device 135, and one I/O interface 140, in other embodiments, any number of these components are included in the system 100. For example, system 100 may include multiple HMDs 105 each having an associated I/O interface 140 and being monitored by one or more imaging devices 135, with each HMD 105, I/O interface 140, and imaging device 135 communicating with the console 110. In alternative configurations, different and/or additional components may be included in the system 100.

The HMD 105 presents content to a user. Examples of content presented by the HMD 105 include one or more images, video, audio, or some combination thereof. In some embodiments, audio is presented via an external device (e.g., speakers and/or headphones) that receives audio information from the HMD 105, the console 110, or both, and presents audio data based on the audio information. In one example, the HMD 105 comprises one or more rigid bodies, which are rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other.

The HMD 105 includes an electronic display 115, an optics block 118, one or more locators 120, one or more position sensors 125, an inertial measurement unit (IMU) 130, and an eye tracking unit 160. The electronic display 115 displays images to the user in accordance with data received from the console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received image light from the electronic display 115, corrects optical errors associated with the image light, and presents the corrected image light to a user of the HMD 105. In an embodiment, the optics block 118 includes one or more optical elements and/or combinations of different optical elements. For example, an optical element is an aperture, a Fresnel lens, a convex lens, a concave lens, a filter, or any other suitable optical element that affects the image light emitted from the electronic display 115. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification is adjusted by adding or removing optical elements.

In an embodiment, the optics block 118 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the HMD 105 relative to one another and relative to a specific reference point on the HMD 105. A locator 120 may be a light emitting diode (LED), a corner cube reflector, a reflective marker, a type of light source that contrasts with an environment in which the HMD 105 operates, or some combination thereof. In embodiments where the locators 120 are active (e.g., an LED or other type of light emitting device), the locators 120 may emit light in the visible band (i.e., ~380 nm to 750 nm), in the infrared (IR) band (i.e., ~750 nm to 1 mm), in the ultraviolet band (i.e., 10 nm to 380 nm), some other portion of the electromagnetic spectrum, or some combination thereof.

In some embodiments, the locators 120 are located beneath an outer surface of the HMD 105, which is transparent to wavelengths of light emitted or reflected by the locators 120 or is thin enough not to substantially attenuate the wavelengths of light emitted or reflected by the locators 120. Additionally, in some embodiments, the outer surface or other portions of the HMD 105 are opaque in the visible band of wavelengths of light. Thus, the locators 120 may emit light in the IR band under an outer surface that is transparent in the IR band but opaque in the visible band.

The IMU 130 is an electronic device that generates fast calibration attributes based on measurement signals received from one or more of the position sensors 125. A position sensor 125 generates one or more measurement signals in response to motion of the HMD 105. Examples of position sensors 125 include: one or more accelerometers, one or more gyroscopes, one or more magnetometers, another suitable type of sensor that detects motion, a type of sensor used for error correction of the IMU 130, and/or some combination thereof. The position sensors 125 may be located external to the IMU 130, internal to the IMU 130, and/or some combination thereof.

Based on the one or more measurement signals from one or more position sensors 125, the IMU 130 generates fast calibration attributes indicating an estimated position of the HMD 105 relative to an initial position of the HMD 105. For example, the position sensors 125 include multiple accelerometers to measure translational motion (forward/back, up/down, and left/right) and multiple gyroscopes to measure rotational motion (e.g., pitch, yaw, and roll). In some embodiments, the IMU 130 rapidly samples the measurement signals and calculates the estimated position of the HMD 105 from the sampled data. For example, the IMU 130 integrates the measurement signals received from the accelerometers over time to estimate a velocity vector and integrates the velocity vector over time to determine an estimated position of a reference point on the HMD 105. Alternatively, the IMU 130 provides the sampled measurement signals to the console 110, which determines the fast calibration attributes. In one embodiment, the reference point is a point that is used to describe the position of the HMD 105. While the reference point may generally be defined as a point in space, however, in practice the reference point is defined as a point within the HMD 105 (e.g., a center of the IMU 130).

The IMU 130 receives one or more calibration parameters from the console 110. As further discussed below, the one or more calibration parameters are used to maintain tracking of the HMD 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The eye tracking unit 160 is configured to generate eye tracking information over time, and create predicted eye tracking information used to generate gaze contingent content. The eye tracking unit 160 determines eye tracking information defining positions of eyes of a user of the HMD 105. The eye tracking unit 160 supples the eye tracking information to a neural network model to determine predicted eye tracking information defining predicted (e.g., future) positions of the eyes. The "positions" the eyes, as used herein, may correspond with the orientation of the eyes, or the direction of the user's gaze within the HMD 105.

In some embodiments, the eye tracking unit 160 may be configured to generate the neural network model. The neural network model defines an algorithmic relationship between the eye tracking information at previous timesteps and the predicted eye tracking information at a future timestep subsequent to the previous timesteps. In some embodiments, the neural network model may include a recurrent neural network (RNN) model. The eye tracking unit 160 may include a recurrent neural network configured to determine the algorithmic relationship between sequences of input eye tracking information and predicted eye tracking information based on training data sets. The predicted eye tracking information may include predicted positions of the user's eyes and/or a predicted vergence depth of the user's eyes. The predicted eye tracking information may be used by the console 110 to generate gaze contingent displays.

As discussed in greater detail below with regard to FIGS. 8 and 9, the neural network model may be generated based on the properties or regularities of eye movements. For example, the observed relationship between maximum eye velocity during a saccade and size of the saccade provides a basis for an algorithmic relationship between input eye tracking information and predicted eye tracking information.

The eye tracking unit 160 may determine the "position" of the user's left and right eyes as an input to the neural network model. The position or orientation of a user's eye may be defined as the direction of the foveal axis, which is the axis between the fovea (an indentation on the retina of the eye) and the center of the eye's pupil. In general, when a user's eyes are fixed on a point, the foveal axes of the user's eyes intersect that point. The pupillary axis is another axis of the eye which is defined as the axis passing through the center of the pupil which is perpendicular to the corneal surface. The pupillary axis does not, in general, directly align with the foveal axis. Both axes intersect at the center of the pupil, but the orientation of the foveal axis is offset from the pupillary axis by approximately −1° to 8° laterally and ±4° vertically. Because the foveal axis is defined according to the fovea, which is located in the back of the eye, the foveal axis can be difficult or impossible to detect directly in some eye tracking embodiments. Accordingly, in some embodiments, eye tracking information including orientation of the pupillary axis is detected and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking unit 160 may also detect translation of the eye: i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking unit may also be detected. Translation of this type may occur, for example, due to shift in the position of the HMD 105 on a user's head. The eye tracking unit 160 may also detect the torsion of the eye, i.e., rotation of the eye about the pupillary axis. The eye tracking unit 160 may use the detected torsion of the eye to estimate the orientation of the foveal axis from the pupillary axis. The eye tracking unit 160 may also track a change in the shape of the eye, which may be approximated as a skew or scaling linear transform or a twisting distortion (e.g., due to torsional deformation). The eye tracking unit 160 may estimate the foveal axis based on some combination of the angular orientation of the pupillary axis, the translation of the eye, the torsion of the eye, and the current shape of the eye.

In some embodiments, the eye tracking unit 160 may include at least one emitter which projects a structured light pattern on a portion of the eye. This pattern then projects onto to the shape of the eye, which may produce a perceived distortion in the structured light pattern when viewed from an offset angle. The eye tracking unit 160 also includes at least one camera which detects the distortions (if any) of the light pattern projected onto the eye. The eye tracking unit 160 estimates, for a given eye of the user, the orientation of the eye by illuminating a portion of the eye using structured light emitted from an emitter. A camera, oriented on a different axis than the emitter, captures the illumination pattern on the eye. This process is denoted herein as "scanning" the eye. By detecting the deformation of the illumination pattern on the surface of the eye, the eye tracking unit 160 can determine the shape of the portion of the eye scanned. The captured distorted light pattern is therefore indicative of the 3D shape of the illuminated portion of the eye. By deriving the 3D shape of the portion of the eye illuminated by the emitter, the orientation of the eye can be derived. Other techniques for determining the position of the eyes may also be used. The eye tracking unit 160 can also estimate the pupillary axis, the translation of the eye, the torsion of the eye, and the current shape of the eye based on the image of the illumination pattern captured by the camera.

As the position may be determined for both eyes of the user, the eye tracking unit 160 is able to determine where the user is looking. The tracking unit 160 can use the positions of the eyes to, e.g., determine velocities of eye movement or the vergence depth of the eyes. The tracking unit 160 may further use positions or orientations to determine inter-pupillary distance (IPD) of the user, determine gaze direction, introduce depth cues (e.g., blur image outside of the user's main line of sight), collect heuristics on the user interaction with the content (e.g., time spent on any particular subject, object, or frame as a function of exposed stimuli), some other function that is based in part on the orientation of at least one of the user's eyes, or some combination thereof.

The imaging device 135 generates slow calibration attributes in accordance with calibration parameters received from the console 110. Slow calibration attributes includes one or more images showing observed positions of the locators 120 that are detectable by the imaging device 135. In some embodiments, the imaging device 135 includes one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration attributes is communicated from the imaging device 135 to the console 110, and the imaging device 135 receives one or more calibration parameters from the console 110 to adjust one or more imaging parameters (e.g., focal length, focus, frame rate, ISO, sensor temperature, shutter speed, aperture, etc.).

The I/O interface 140 is a device that allows a user to send action requests to the console 110. An action request is a request to perform a particular action. For example, an action request may be to start or end an application or to perform a particular action within the application. The I/O input interface 140 may include one or more input devices. Example input devices include: a keyboard, a mouse, a game controller, electronic gloves, hand/body cameras, or any other suitable device for receiving action requests and communicating the received action requests to the console 110. An action request received by the I/O interface 140 is communicated to the console 110, which performs an action corresponding to the action request. In some embodiments, the I/O input interface 140 may provide haptic feedback to the user in accordance with instructions received from the console 110. For example, haptic feedback is provided when an action request is received, or the console 110 communicates instructions to the I/O input interface 140 causing the I/O input interface 140 to generate haptic feedback when the console 110 performs an action.

The console 110 provides (e.g., gaze contingent) content to the HMD 105 for presentation to a user in accordance with information received from one or more of: the imaging device 135, the HMD 105, and the I/O interface 140. In one embodiment, the console 110 is a computer system, such as a desktop or laptop computer. Alternatively, the console 110 may be a device having computer functionality, such as a personal digital assistant (PDA), a mobile telephone, a smartphone or another suitable device.

In the example shown in FIG. 1, the console 110 includes an application store 145, a tracking module 150, and an application engine 155. Some embodiments of the console 110 have different modules than those described in conjunction with FIG. 1. Similarly, the functions further described below may be distributed among components of the console 110 in a different manner than is described here.

The application store 145 stores one or more applications for execution by the console 110. An application is a group of instructions, that when executed by a processor, generates content for presentation to the user. Content generated by an application may be in response to inputs received from the user via movement of the HMD 105 or the I/O interface device 140. Examples of applications include: gaming applications, conferencing applications, video playback application, or other suitable applications.

The tracking module 150 calibrates the system 100 using one or more calibration parameters and may adjust one or more calibration parameters to reduce error in determination of the position of the HMD 105. For example, the tracking module 150 adjusts the focus of the imaging device 135 to obtain a more accurate position for observed locators on the HMD 105. Moreover, calibration performed by the tracking module 150 also accounts for information received from the IMU 130. Additionally, if tracking of the HMD 105 is lost (e.g., the imaging device 135 loses line of sight of at least a threshold number of the locators 120), the tracking module 140 re-calibrates some or the entire system 100.

The tracking module 150 tracks movements of the HMD 105 using slow calibration information from the imaging device 135. The tracking module 150 determines positions of a reference point of the HMD 105 using observed locators from the slow calibration information and a model of the HMD 105. The tracking module 150 also determines positions of a reference point of the HMD 105 using position information from the fast calibration information. Additionally, in some embodiments, the tracking module 150 uses portions of the fast calibration information, the slow calibration information, or some combination thereof, to predict a future location of the HMD 105. The tracking module 150 provides the estimated or predicted future position of the HMD 105 to the application engine 155.

The application engine 155 executes applications within the system 100 and receives eye tracking information and/or predicted eye tracking information. The application engine 155 may further receive (e.g., head) position information, acceleration information, velocity information, predicted future positions, or some combination thereof of the HMD 105 from the tracking module 150. Based on the received information, the application engine 155 determines gaze contingent content to provide to the HMD 105 for presentation to a user. Additionally, the application engine 155 performs an action within an application executing on the console 110 in response to an action request received from the I/O interface 140 and provides feedback to the user that the action was performed. For example, the provided feedback includes visual or audible feedback via the HMD 105 or haptic feedback via the I/O interface 140.

Figure 2:
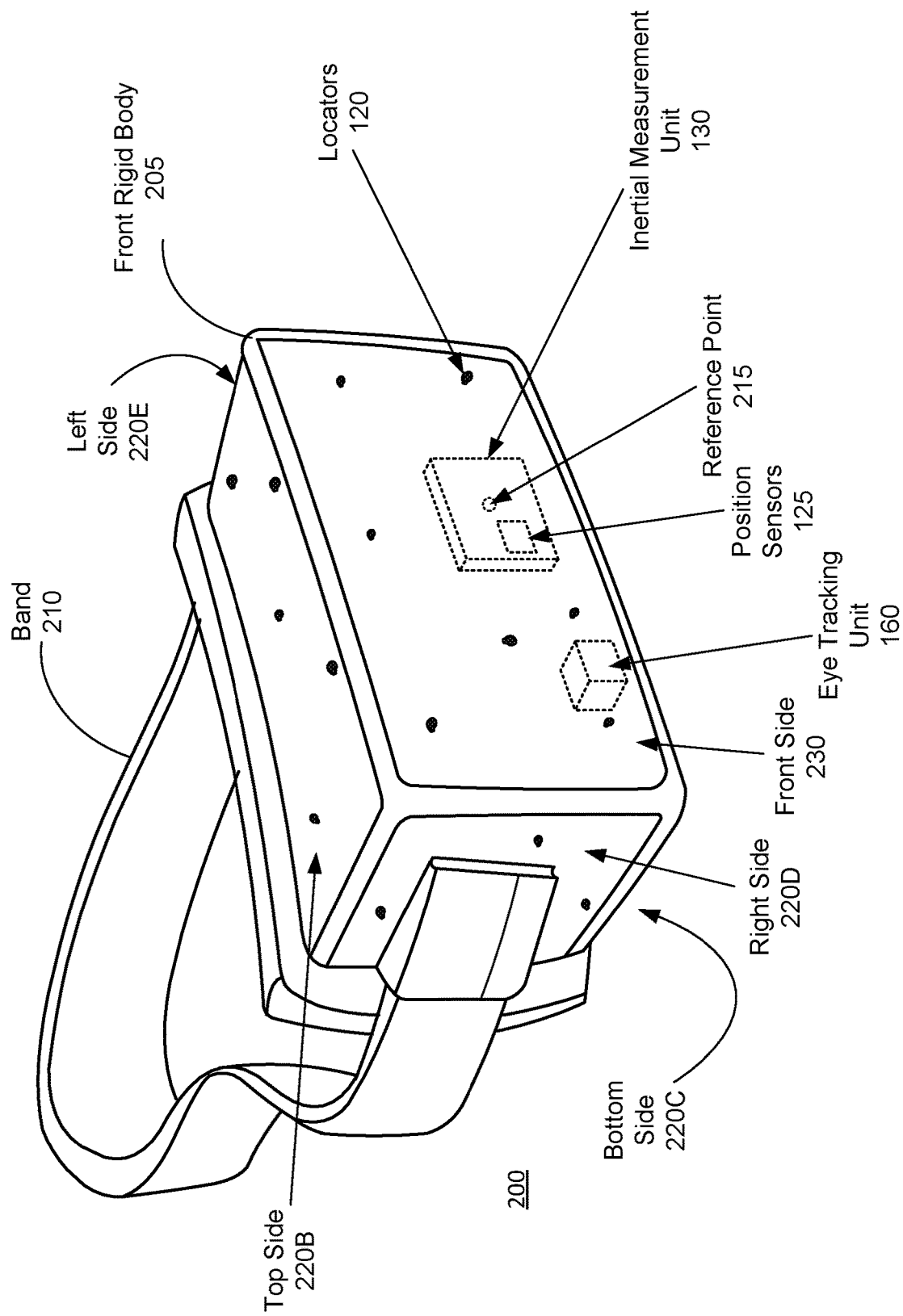
FIG. 2 is a diagram of a head-mounted display, in accordance with some embodiments.

FIG. 2 is a block diagram of a HMD 200, in accordance with some embodiments. The HMD 200 is an embodiment of the HMD 105, and includes a front rigid body 205 and a band 210. The front rigid body 205 includes an electronic display element of the electronic display 115 (not shown in FIG. 2), the optics block 118 (not shown in FIG. 2), the IMU 130, the one or more position sensors 125, an eye tracking unit 160, and the locators 120. In the embodiment shown by FIG. 2, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2.

The HMD 200 includes an eye tracking unit 160. To generate eye tracking information, the eye tracking unit 160 may include a structured light emitter to project a structured light pattern onto the user's eye and a camera to detect the illuminated portion of the eye. The emitter and the camera may be located off the axis of the user's gaze. In FIG. 2, the eye tracking unit 160 is located below the axis of the user's gaze, although the eye tracking unit 160 can alternately be place elsewhere. In some embodiments, the eye tracking unit 160 may include a camera and structured light emitter for each of the left eye and right eye of the user. The eye tracking unit 160 may further include an eye tracking controller. The controller is configured to determine predicted eye tracking information based on applying (e.g., measured or estimated) eye tracking information to a neural network model. The neural network model may include a recurrent neural network model that defines an algorithmic relationship between eye tracking information (e.g., at a sequence of prior timesteps) and predicted eye tracking information (e.g., at a timestep subsequent to the prior timesteps. In some embodiments, the eye tracking controller may be further configured to perform machine learning for the neural network model based on training data sets.

Figure 3:
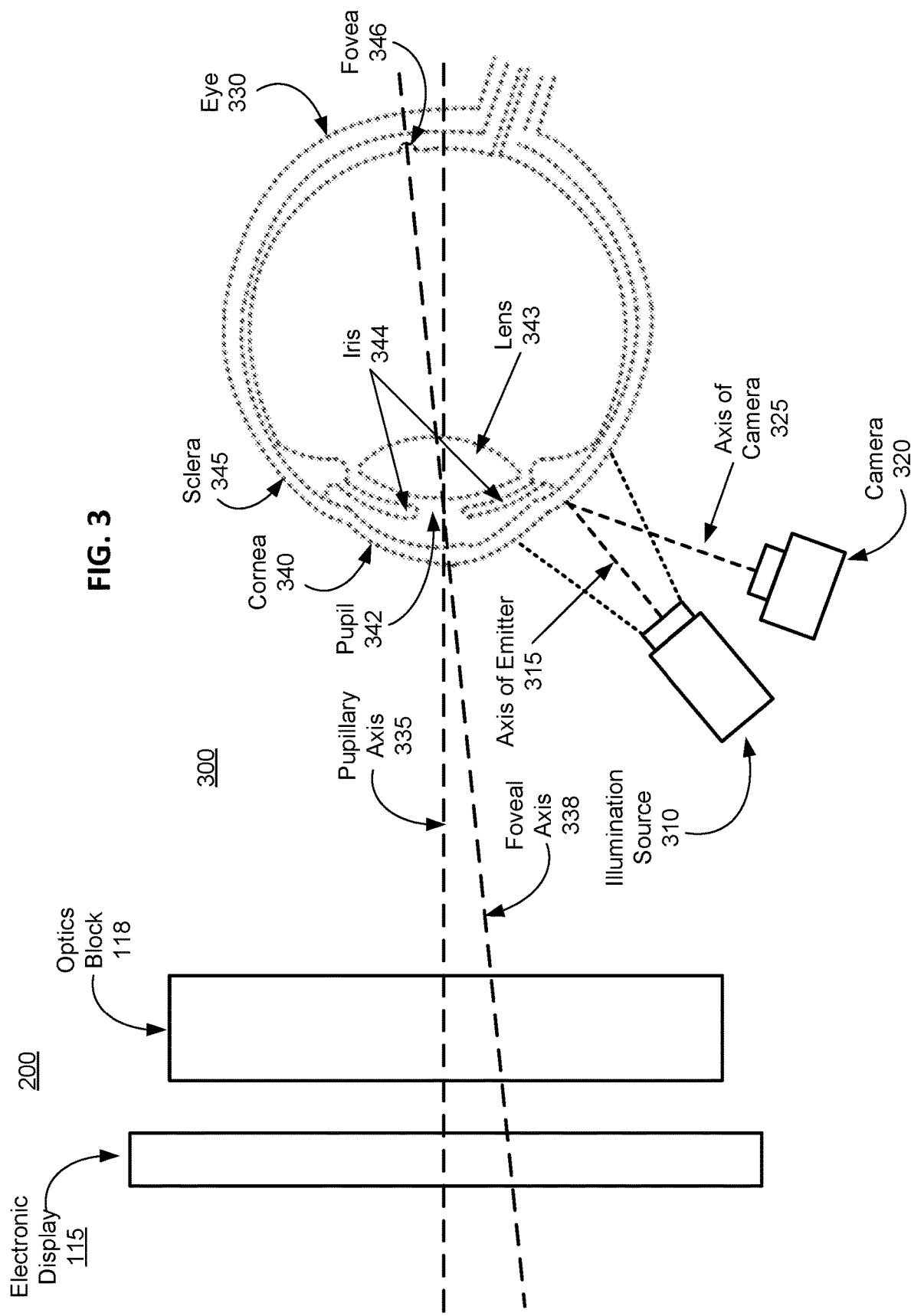
FIG. 3 is a cross section of a portion of the HMD, in accordance with some embodiments.

FIG. 3 depicts a cross section of a portion of the HMD 200, according to an embodiment. The HMD 200 includes an illumination source 310 and a camera 320. In some embodiments, the HMD 200 is a structured light eye tracking system. For example, the illumination source 310 may include a structured light emitter. FIG. 3 depicts a single illumination source 310 and a single camera 320 detecting the orientation of a single eye 330. However, in alternate embodiments, multiple illumination sources or multiple cameras may be employed for a single eye. Similarly, for each of the user's eyes, a corresponding illumination source and camera may be employed.

A structured light emitter emits a structured light pattern onto a portion of a user's eye. In the context of a single eye of a user, the structured light pattern is incident upon the surface of a portion of the eye 330. The structured light pattern distorts based in part on, e.g., the geometry of the illuminated surface and emitter to camera geometry, to form a distorted illumination pattern. The variation in the distorted illumination pattern is indicative of the 3D structure of a portion of the surface of the eye 330. In some embodiments, the portion of the eye covers the sclera 345, cornea 340, or both. The camera 320 detects the distorted light pattern on the portion of the eye 330 illuminated by the illumination source 310. The camera 320 may be an infrared camera (i.e., a camera designed to capture images in the infrared frequency). The camera may be a near-infrared camera with digital image sensors sensitive to the bandwidth of light emitted by the structured light emitter 310. The camera 320 detects the distorted illumination pattern and converts the captured light into a digital image, I. The digital image, I, may be a binary image (i.e., an image in which each pixel has a binary value) or a single channel image (an image in which each pixel maps to a single floating-point or integer value). In embodiments in which the illumination source 310 emits patterns of light of N distinct frequencies or N distinct center-frequencies, I may be an N-channel image.

The camera 320 may be specially configured to detect electromagnetic radiation within the band that the illumination source 310 projects. The camera 320 may employ a narrowband band-pass filter which filters out light outside of the spectrum emitted by the illumination source 310. When this band is relatively small, the signal-to-noise ratio (SNR) is large, which allows images to be captured by the camera 320 rapidly. In some embodiments, the camera 320 is a high-frequency camera, but when high frequency is not needed, the camera 320 may capture images at a frequency less than the maximum frequency. The frame rate with which images are captured by the camera 320 is generally 60 Hz of greater, although some embodiments may capture images at a slower rate. The structured light emitter 310 may be configured to only emit light when the camera 320 is capturing images.

The camera 320 may capture images at a first frequency during normal operating conditions, but certain conditions may trigger the camera 320 to capture images at a higher frequency. For example, when the eye tracking unit 160 cannot detect the orientation of the eye 330, the scan may be considered a "bad scan." A "bad scan" may be triggered by the user blinking. In the case of a "bad scan," the scan may be disregarded and the camera 320 can be triggered to immediately capture another scan of the eye 330 until a successful scan is recorded. In this manner, the eye tracking unit 160 can ensure that the tracking of the eye's orientation is as accurate and current as possible, without requiring unnecessary computation and power consumption.

The eye 330 includes a cornea 340, a pupil 342, a lens 343, an iris 344, a sclera 345, and a fovea 346. The sclera 345 is the relatively opaque (usually visibly white) outer portion of the eye 330, which is often referred to as the "white of the eye." The cornea 340 is the curved surface covering the iris and the pupil of the eye. The cornea 340 is essentially transparent in the visible band (~380 nm to 750 nm) of the electromagnetic spectrum, and the near-infrared region (up to approximately 1,400 nanometers). The lens 343 is a transparent structure which serves to focus light at the retina (the back of the eye 330). The iris 344 is a thin, colored, circular diaphragm concentric with the pupil 342. The iris 344 is the colored portion of the eye which contracts to alter the size of the pupil 342, a circular hole through which light enters the eye 330. The fovea 346 is an indent on the retina. The fovea 346 corresponds to the area of highest visual acuity.

Due to the rotation and movement of the eye 330, the portion of the eye's surface illuminated by the illumination source 310 may be variable. In some embodiments, the illumination source 310 projects light in a spectrum where the cornea 340 is nearly transparent (e.g., the near IR or visible spectrum). In the case in which part of the structured light pattern passes through cornea 340 and illuminates the iris 344, the resultant illumination pattern on the approximately planar interface of the iris is distorted according to some optical power of the surface of the cornea 345. For the region within the pupil 342 of the iris 344, the intensity of the illumination pattern is significantly reduced. In some embodiments, the illumination pattern upon the pupil 342 is considered to be negligible. The eye tracking unit 160 may identify a distorted circular unilluminated portion in the image captured by the camera 320 as the pupil 342 and determine the angular orientation of the eye 330 based on the position of the pupil 342.

In some embodiments, the illumination source 310 projects light in a spectrum where the cornea 340 is nearly opaque (e.g., IR light with a wavelength greater than 1.5 μm) and the camera 320 (e.g., a long IR camera) detects the resultant illumination pattern. When the cornea 340 is illuminated by the structured light pattern, the eye tracking unit 160 may estimate the eye's angular orientation and/or translation based on the curvature of the cornea 340. Because the cornea 340 projects outward from the approximately ellipsoidal sclera 345, the eye tracking unit 160 may estimate an orientation of the eye 330 by detecting the curvature of the cornea 340. The eye tracking unit 160 may also estimate the eye's orientation by detecting the cornea-sclera interface, i.e., the roughly circular outline where the surface of the cornea 340 and the surface of the sclera 345 intersect. The eye tracking unit 160 may also estimate the eye's orientation by detecting the vertex of the cornea 340, i.e., the part of the cornea 340 that extends furthest from the center of the eye 330.

The eye's pupillary axis 335 and foveal axis 338 are depicted in FIG. 3. The pupillary and foveal axes 335, 338 changes as the eye 330 moves. In FIG. 3, the eye 330 is depicted with a horizontal pupillary axis 335. Accordingly, the foveal axis 338 in FIG. 3 points about 6° below the horizontal plane. FIG. 3 also depicts the axis of the emitter 315 and the axis of the camera 325. FIG. 3 depicts an embodiment in which the structured light emitter 310 and the camera 320 are not on either the pupillary axis 335 or the foveal axis 338. The illumination source 310 and the camera 320 may be outside the visual field of the eye 330.

Figure 4:
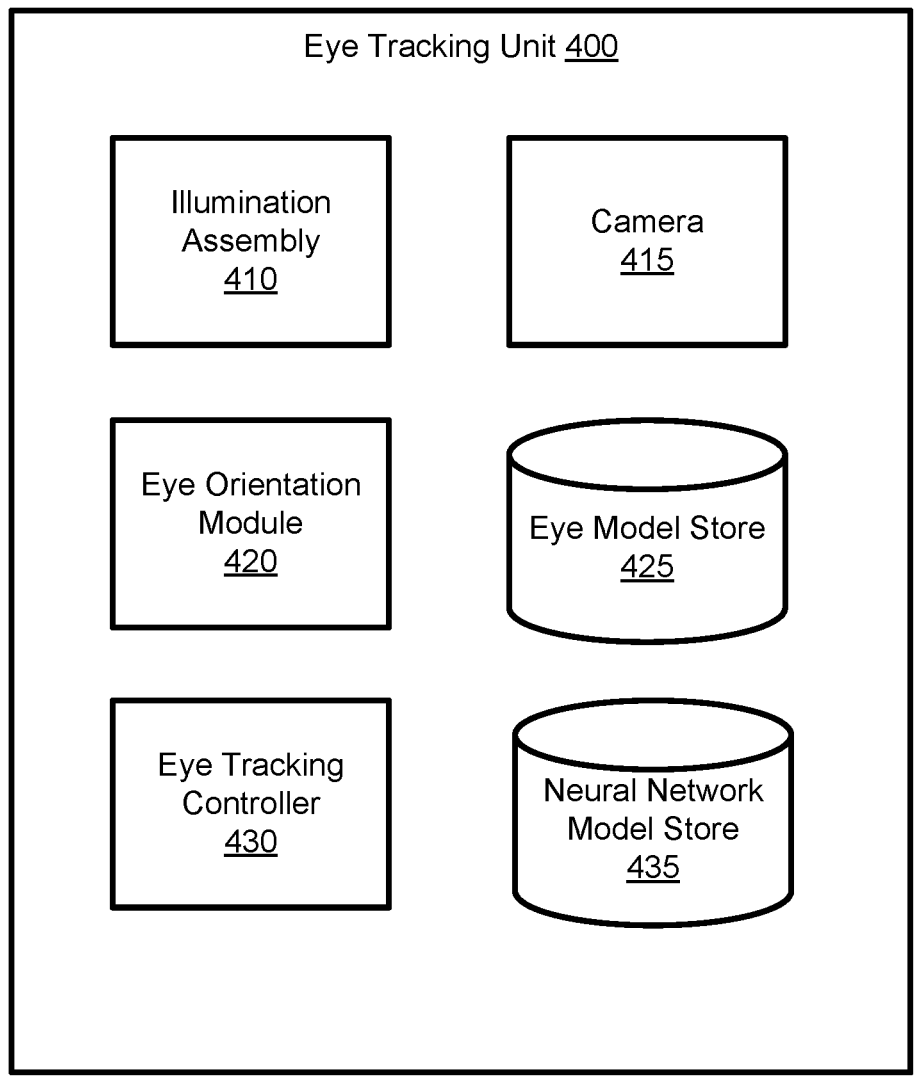
FIG. 4 is a block diagram of an eye tracking unit, in accordance with some embodiments.

FIG. 4 is a block diagram of an eye tracking unit 400, in accordance with some embodiments. Some embodiments of the eye tracking unit 400 have different components than those described here. Similarly, the functions can be distributed among the components in a different manner than is described here. The eye tracking unit 400 includes an illumination assembly 410, a camera 415, an eye orientation module 420, an eye model store 425, an eye tracking controller 430, and a neural network model store 435. In some embodiments, the eye tracking unit 400 is the eye tracking unit 160 of the HMD 105. In some embodiments, the eye tracking unit 400 is part of a VR or AR system that tracks user eye movement. The eye tracking unit 400 may track both eyes of a user and may include multiple illumination sources (e.g., structured light emitters) and multiple cameras 415, such as one for each eye.

In some embodiments, the illumination assembly 410 projects a structured light pattern onto the eyes of the user. The camera 415 detects the distorted illumination pattern caused by the user's eye. The camera 415 converts the captured light into a digital image, I. In some embodiments, the camera 415 is the camera 320. In embodiments in which the model of the eye, M, is an image generating function, $I_M(\alpha, \beta)$, the images generated by $I_M(\alpha, \beta)$ may be the same type of images as I (e.g., binary images, single-channel images, or multi-channel images). The images output by $I_M(\alpha, \beta)$ may also be of the same size (e.g., in pixels) as the image, I, output by the camera 415.

The eye orientation module 420 is configured to generate eye tracking information based on image data received from camera 415. For example, the eye orientation module 420 receives an image, I, as an input from the camera 415 and determines the orientation of the eye based on a model, M, from the model store 425. The eye orientation module 420 may be a software module implemented on one or more processors, a dedicated hardware unit, or some combination thereof.

In some embodiments, the eye orientation module 420 may be configured to train eye models M prior to tracking during a calibration sequence. The calibration sequence implemented may involve using the camera 420 and the illumination assembly 410 to repeatedly scan the eye. In one embodiment, the user is instructed to look at a certain virtual object or visual indicator that is displayed on the electronic display 115 of the HMD 105. A portion of the eye can be scanned while the user is looking at the visual indicator. In this way, the eye tracking unit 400 can capture sample scans of the eye at known orientations of the eye. These sample scans can be interpolated into a model, M, which is stored in the eye model store 425. Once the eye orientation module 420 has produced M, eye tracking may begin. In general, eye tracking with a model, M, trained for a specific user's eye is more accurate than eye tracking without such a model. In some embodiments, the eye orientation module 420 continues to update M during tracking. During calibration, in addition to creating the model of the eye, M, the eye orientation module 420 may also determine a pattern of light that is best suited for detecting the orientation of the eye among several candidate patterns. In some embodiments, a best structured light pattern may be determined for a given range of orientations of the eye. During eye tracking, the optimal structured light pattern may be projected onto the eye responsive to the previously detected orientation of the eye.

The eye model store 425 is a memory that stores a model, M, of a user's eye, which is used to compare to image data to determine (or estimate) the current position or orientation of the eye. The eye model store 425 is a memory, such as a ROM, DRAM, SRAM, or some combination thereof. The eye model store 425 may be part of a larger digital memory of the HMD environment 100. The model, M, stored in the model store 425 can be a 3D model of the eye's surface. In embodiments in which both of a user's eyes are scanned, the model store 425 may contain two model's $M_1$ and $M_2$: one for each eye.

In some embodiments, M is a 3D model which approximates the surface geometry of the eye. The 3D model may have two orthogonal axes defined about which the model of the eye rotates. Thus, the 3D model may incorporate two angles, α (yaw) and β (pitch), which specify the orientation of the eye relative to the centered orientation of the eye (i.e., α=β=0° corresponds to the eye looking straight ahead). α and β may correspond to the angular direction of the foveal axis. In some embodiments, M may also incorporate a roll angle, γ, which corresponds to the roll of the eye (i.e., the torsion). M may further incorporate a translation vector $[x_0, y_0, z_0]^T$, which specifies a translation of the 3D model in a Cartesian coordinate system. In some embodiments, the angle of the pupillary axis or (α, β) is mapped to a translation vector, $[x_0, y_0, z_0]^T$. In embodiments in which detecting the orientation of the eye comprises detecting the pupil, M may incorporate a pupil diameter, d. In some embodiments, the foveal axis is calculated based on the angle of the pupillary axis, $[x_0, y_0, z_0]^T$, γ, and a parameter corresponding to the location of the fovea stored in M. In some embodiments, tracking the eye may constitute finding the values of α and β which make the 3D model of the eye most closely fit the scanned portion of the eye. In some embodiments, tracking the eye comprises matching the scanned portion of the eye to M using some combination of α and β, the angle of the pupillary axis, $[x_0, y_0, z_0]^T$, γ, and d.

The neural network model store 435 is configured to store a trained neural network model defining algorithmic relationships between eye tracking information and predicted eye tracking information. In some embodiments, the neural network model includes a recurrent neural network model. The neural network model may be generated in a (e.g., supervised) machine learning process based on training data sets, and updated when appropriate as discussed herein.

The eye tracking controller 430 is configured to perform the control functionality discussed herein with respect to generating predicted eye tracking information. For example, the eye tracking controller 430 may be configured to receive eye tracking information generated by the eye orientation module 420, and supply the eye tracking information to a neural network model stored in the neural network model store 440 to generate predicted eye tracking information. The eye tracking controller 430 may be further configured to provide the predicted eye tracking information to the console 110, which generates and sends display instructions defining gaze contingent content to the display 115.

The eye tracking controller 430 is configured to determine predicted eye tracking information such as eye positions defining the gaze direction for both of a user's eyes, uncertainties associated with the predicted gaze directions, and vergence depth. As discussed in greater detail below with respect to FIG. 9, the use of a recurrent neural network allows for weighting of different intervals of eye movement to prevent overshoot in the predicted locations.

The eye tracking controller 430 (and neural network model store 435) is shown in FIG. 4 as being located within an eye tracking unit 400 of an HMD. However, in other embodiments, the eye tracking controller 430 may be separate from the HMD, such as at the console 110, a central system 540 (e.g., at the neural network module 615), or other device.

Figure 5:
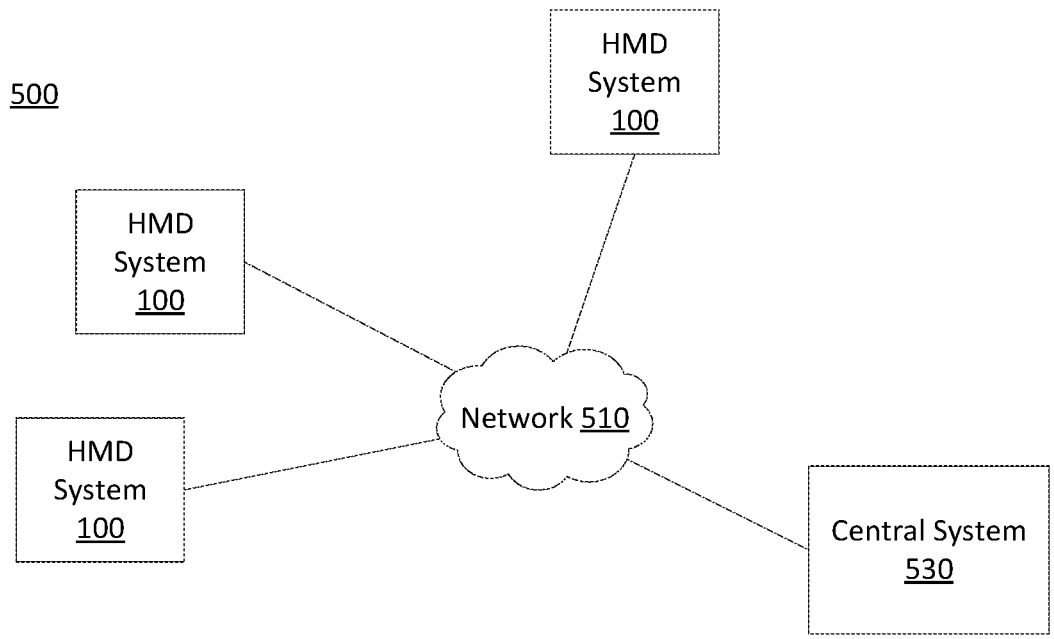
FIG. 5 is a block diagram of a system, in accordance with some embodiments.

FIG. 5 is a block diagram of a system 500, in accordance with some embodiments. The system 500 includes one or more HMD systems 110, a network 510, one or more third-party systems 520, and a central system 530. In alternative configurations, different and/or additional components may be included in the system 100. The embodiments described herein can be adapted to online systems, such as social networking systems.

The HMD systems 100 include one or more computing devices (e.g., console 110, HMD 105) capable of receiving user input as well as transmitting and/or receiving data via the network 510, as shown in FIG. 1. In one embodiment, the console 110 executes an application allowing a user of the console 110 to interact with the central system 530.

The HMD system 110 is configured to communicate via the network 510, which may comprise any combination of local area and/or wide area networks, using both wired and/or wireless communication systems. In one embodiment, the network 510 uses standard communications technologies and/or protocols. For example, the network 510 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 510 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 510 may be represented using any suitable format, such as hypertext markup language (HTML) or extensible markup language (XML). In some embodiments, all or some of the communication links of the network 510 may be encrypted using any suitable technique or techniques.

Figure 6:
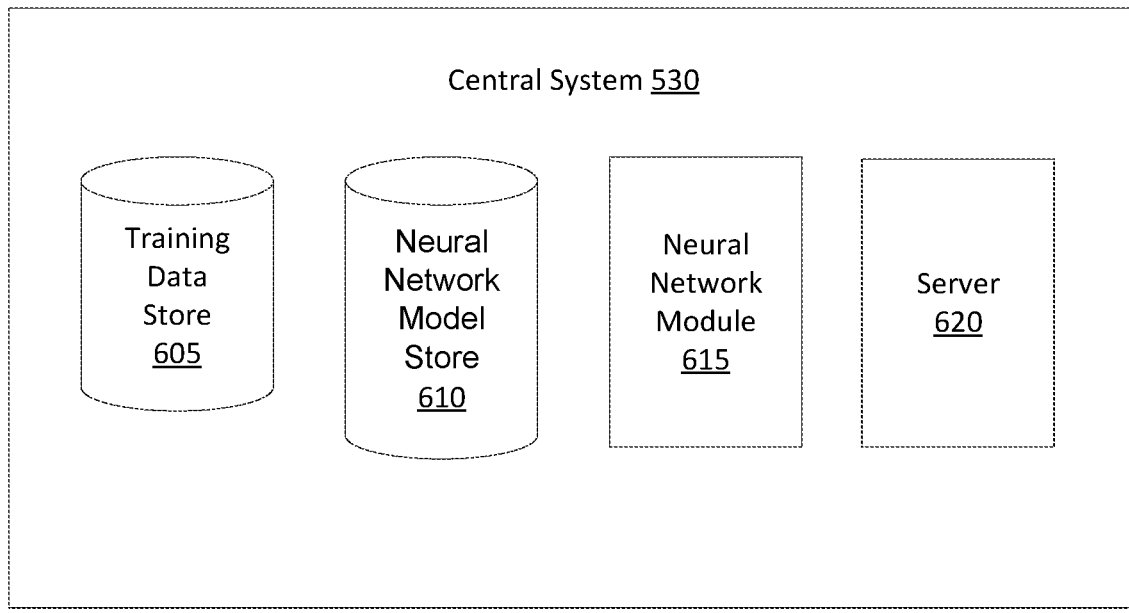
FIG. 6 is a block diagram of a central system, in accordance with some embodiments.

FIG. 6 is a block diagram of architecture of the central system 530, according to an embodiment. The central system 530 shown in FIG. 6 includes a training data store 605, a neural network model store 610, a neural network training module 615, and a server 620. In other embodiments, the central system 530 may include additional, fewer, or different components for various applications. Conventional components such as network interfaces, security functions, load balancers, failover servers, management and network operations consoles, and the like are not shown so as to not obscure the details of the system architecture.

The training data store 605 stores training data sets used to generate the neural network model for determining predicted eye tracking information. The training data sets include training eye tracking information, such as the eye position changes over multiple timesteps. Each training data set may define a sequence of timesteps that can be separated into input and target output of the neural network. A training data set represents a ground truth data set of inputs and outputs that is used to train the neural network model. The central system 530 may be configured to collect large volumes of eye tracking information to generate training data sets. In some embodiments, the eye tracking information may be collected from HMD systems 110 via the network 510.

The neural network model store 610 stores one or more neural network models. For example, the neural network model store 610 may include a recurrent neural network model that is generated based on using the training data sets stored in the training data store 605 to train a recurrent neural network. The neural network model store 610 may be configured to store a trained neural network model, which may be updated at the central system 530 and pushed out to HMD systems 100 (e.g., the neural network model store 435 of the eye tracking unit 400).

The neural network module 615 generates the neural network model stored within the neural network model store 610 based on the training data sets stored in the training data store 605. The neural network model defines an algorithmic relationship between eye tracking information (e.g., past eye tracking information) and predicted eye tracking information (e.g., future eye tracking information). In some embodiments, the neural network module 615 includes a recurrent neural network. The recurrent neural network receives eye tracking information as a time series of inputs (or timesteps), and generates predicted eye tracking information output based on this series. At each timestep, the recurrent neural network provides a copy of its hidden state (or hidden layer units) from one or more previous timesteps to a copy layer, and computes the current hidden state based on the hidden state from the copy layer and input eye tracking information. Thus the recurrent neural network is able to receive an arbitrary temporal sequence including multiple timesteps as inputs to generate a predicted output for a subsequent timestep.

The server 620 links the central system 530 via the network 510 to the HMD systems 110, as well as to the one or more third party systems 520. The server 620 may be configured to provide the trained neural network model generated by the neural network module 615 to the HMD systems 110. The server 620 may be further configured to receive eye tracking information from the HMD systems 110, which may be used to train, update, or test the neural network model. The server 620 may also serve web pages, as well as other web-related content, such as JAVA®, FLASH®, XML and so forth.

Gaze Contingent Content Displays Based on Predicted Eye Tracking

Figure 7:
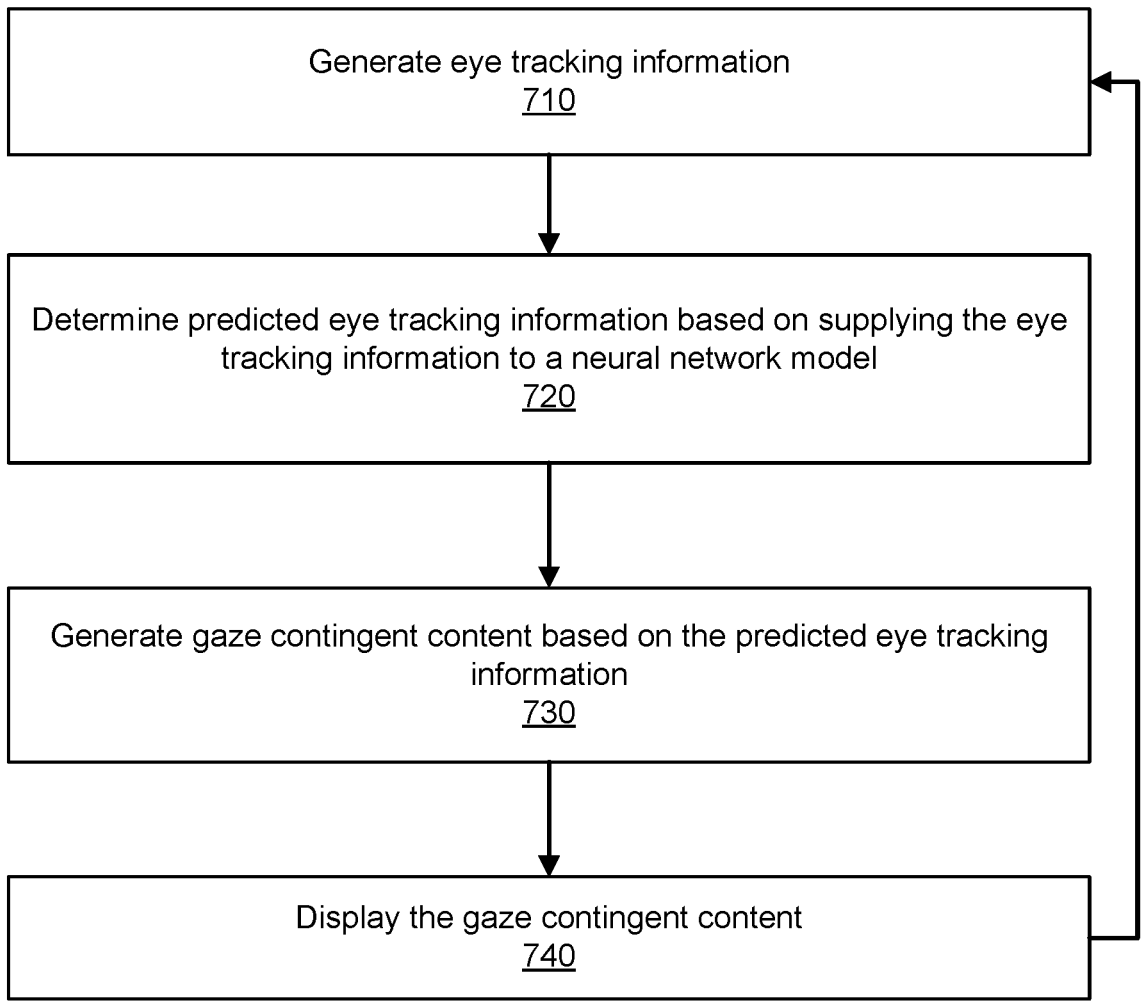
FIG. 7 is a flow chart illustrating a process for providing gaze contingent content on a HMD based on predicted eye tracking information, in accordance with some embodiments.

FIG. 7 is a flow chart illustrating a process 700 for providing gaze contingent content on a HMD based on predicted eye tracking information, in accordance with some embodiments. In one embodiment, the process of FIG. 7 is performed by the HMD system 100. Other entities may perform some or all of the steps of the process in other embodiments. Likewise, embodiments may include different and/or additional steps, or perform the steps in different orders.

The eye tracking controller 430 generates 710 eye tracking information. The eye tracking controller 430 may be located within the HMD 105 or at the console 110. The eye tracking information includes the positions of the left and right eyes of a user of the HMD 100. Eye "position," as used herein, refers to the orientation of the eyes, and defines the user's gaze direction. User eye position may be determined using any suitable technique. In some embodiments, the eye tracking information may be created by the eye tracking unit 160/400 as described above. For example, an illumination assembly 410 may illuminate an eye with non-visible light such as infrared structured light, which is captured by a camera 415 of the eye tracking unit 400. The camera image may be processed by the eye orientation module 425 to determine the (e.g., estimated) eye position. Other techniques for generating the eye tracking information may also be used.

In some embodiments, image data from multiple asynchronous cameras may be synchronized to generate the eye tracking information. The HMD 100 may include a first camera configured to capture first image data frames of the first eye and a second camera configured to capture second image data frames of the second eye. The first camera and the second camera operate using asynchronous threads. The eye tracking controller 430 may be further configured to synchronize the first image data frames and the second image data frames based on timestamps. When the eyes are imaged by two cameras that are operating using asynchronous threads, there may be frame loss when the eye tracking controller 430 attempts to construct or output on a frame by frame basis (e.g., at 4 ms per frame). In order to compensate, a timestamp is output every 1 second (e.g., rather than with every frame) for each camera. Frame numbers for images of each frame may then be inferred based on the timestamp, and ambiguous data may be discarded. The inference may be based on determining corresponding alignments in left and right eyes from the frames. When the frame sequences are aligned, vertical positions of the left and the right eyes are tightly aligned. For instance, the onset of the vertical component of the saccade occurs at the same time in both eyes if image data from the asynchronous camera are synchronized. In some embodiments, the multiple cameras are synchronized without using the timestamps.

The eye tracking information may include position data for the left and right eyes captured over time. Each instance of eye tracking information captured at a particular time may define a timestep. The position data for each eye at a given timestep may be represented in various forms, such as $\alpha$ (yaw) and $\beta$ (pitch), which specify the orientation of the eye relative to the centered orientation of the eye (i.e., $\alpha=\beta=0°$ corresponds to the eye looking straight ahead). In another example, the eye tracking information may be defined by coordinates, such as the (X, Y) pixel location on the display that corresponds with where the user is looking.

In some embodiments, eye tracking information may include or define vergence depth of the user's eyes. In a varifocal display, the focal depth of the display is adjustable (e.g., using optic blocks). If the eye's accommodative state is unknown, as a starting point, the vergence depth can be predicted which is related or coupled to the eye's accommodative state. Vergence is the process by which the eyes move in equal and opposite directions to focus on an object. Near objects require the left and right eyes to orient inwards, while far objects require the left and right eyes to orient outwards (e.g., be more parallel). The vergence depth defines a distance from the center of the eyes to the focal point, and thus may be calculated based on eye positions and inter-pupillary distance between the eyes, as shown by Equation 1:

$$\frac{1}{z} = \frac{1}{d} * (\tan(\alpha_L) - \tan(\alpha_R)) \qquad (1)$$

where d is the interpupillary distance between the eyes, $\alpha_L$ is the yaw angle (e.g., the angle in the horizontal x dimension) of the left eye, $\alpha_R$ is the yaw angle of the right eye, and z is the vergence depth. In some embodiments, the input to the RNN uses only vergence depth, and outputs a predicted vergence depth. In another example, the input to the RNN includes only eye positions, and outputs a vergence depth based on predicted eye positions. In yet another example, the input to the RNN includes eye positions and vergence depth, and the RNN outputs a vergence depth.

RNN regression on different input features may produce predicted eye tracking information of various quality. For example, directly regressing on vergence depth may be advantageous compared with regressing on eye position and then calculating the vergence depth. This may occur when the error function is an isotropic Gaussian and the errors between the predictions of the x positions of the two eyes are uncorrelated. In contrast, directly regressing on vergence depth may force the error in the direction of ($\alpha_L - \alpha_R$) to be smaller.

In some embodiments, eye tracking information may further include velocities of the left and right eyes. For example, the velocity of each eye may be determined based on changes in the position of each eye over time. The eye tracking unit 160 may be configured to continuously generate the eye tracking information while the user is wearing the HMD 100 to facilitate creation a display of gaze contingent content.

In some embodiments, information other than eye tracking information is used as an input to the neural network. The information may include, for example, the angular velocity of the user's head, or the position of the user's head, or some other feature. Here, the neural network model may further define algorithmic relationships between the angular velocity of the head and the predicted eye tracking information.

Eye tracking information is used as an input of an algorithmic transformation (e.g., a neural network model) that results in predicted eye tracking information output. As discussed above, various types of eye tracking information may be used as inputs a neural network, such as eye tracking information including position data defining the positions of the eyes, velocity data defining eye velocities, and/or vergence depth data defining vergence depth. Various combinations of eye tracking information, as well as other types of information, may be used as inputs to the neural network model. Use of more types of data may result in more accurate prediction by the neural network, although more processing may be needed for each output. In one example, eye tracking information includes only eye positions. In one example, the eye tracking information includes eye positions and vergence depth. In another example, the eye tracking information includes each of eye positions, eye velocities, and vergence depth. Eye positions, velocities, vergence depth, or other parameters, may be chosen based on their predictive utility with respect to eye positions at a subsequent timestep. In some embodiments, input data to the neural network model may further include user pupil size, user head motion, and/or eye position estimation uncertainty.

In some embodiments, the eye tracking controller 430 may be configured to perform a calibration error analysis. The calibration error analysis may be performed to provide a comparison between the reduced error achieved by the neural network and the error caused by calibration that cannot be compensated for. In particular, the calibration error refers to error in the estimation of eye position based on instrument readings, such as image data received from camera 415. For a user having a vergence depth defined along a z axis, this corresponds to an angle for $\alpha_L$ and $\alpha_R$ of $$\tan^{-1}\frac{d}{2z},$$

where d is me interpupillary distance between the eyes. Applying an error $\Delta\alpha$ to Equation 1, in the small angle limit, this corresponds to an error shown by Equation 2:

$$\frac{1}{z} + \Delta\frac{1}{z} = \frac{2}{d}*(\tan(\alpha + \Delta\alpha)) = \frac{2}{d}*(\tan(\alpha + \Delta\alpha*\sec^2(\alpha))) \quad (2)$$

where $$sec^2(\alpha) = \left(\frac{d}{2z}\right)^2 + 1 \approx 1.$$

In an example, if the error $\Delta\alpha$ in eye position measurement is 0.5°, then this corresponds with an error shown by Equation 3:

$$\Delta\frac{1}{z} = \frac{2}{0.65\ m}*\Delta\alpha*\frac{\pi}{180} = 0.53(m^{-1})*\Delta\alpha = 0.25\ m^{-1} \quad (3)$$

Therefore, calibration error can affect measurements of vergence depth. In some embodiments, a neural network may compensate for calibration error by being trained using training data sets generated from eye tracking information captured from different HMD systems 100, and/or different users of HMD systems 100.

The eye tracking controller 430 determines 720 predicted eye tracking information based on supplying the eye tracking information to a neural network model. The eye tracking controller 430 may include neural network circuitry configured to utilize the trained neural network model. The neural network model defines an algorithmic relationship between input eye tracking information and output predicted eye tracking information. For example, the neural network model may define an algorithmic relationship between the (e.g., estimated or measured) eye tracking information at one or more first timesteps and predicted eye tracking information at a second timestep subsequent to the first timesteps. In some embodiments, the neural network model is a recurrent neural network model, and the eye tracking controller 430 includes a recurrent neural network that implements the neural network model. Creation of the recurrent neural network model for effective eye tracking information prediction is discussed in greater detail below in connection with FIGS. 8 and 9.

In some embodiments, the eye tracking controller 430 accesses a trained neural network model from the neural network model store 435. The neural network model may be generated in machine learning process by the eye tracking controller 430, or generated remotely by the neural network module 615 of the central system 530, and then provided to the eye tracking controller 430.

The predicted eye tracking information output from the neural network model may include predicted eye positions and/or predicted vergence depth, which is then used to generate gaze contingent content, adjust optics blocks or the display, or control other components of the HMD system 100. Thus the experience of the user is enhanced based on the user's predicted eye behavior, and furthermore, the time delay between the user's eye position while in motion and the corresponding gaze contingent content displayed on the HMD is reduced.

In some embodiments, the eye tracking controller 430 may be configured to provide input handling for the eye tracking information before the eye tracking information is supplied to the neural network model. The eye tracking controller 430 may be configured to determine a data validity flag associated the eye tracking information prior to supplying the eye tracking information to the neural network model. The eye tracking unit 160 may lose track of the position of the eye for various reasons, such as user blinking or eyelash interference with the localization of the pupil. When a particular instance of eye tracking information is valid, the eye tracking controller 430 may be configured to output a data validity flag along with the estimated eye position. In another example, the data validity flag may indicate that an instance of eye tracking information is invalid. If the validity flag is not trustworthy, additional validation may be performed. In some embodiments, input handling may include filtering such that valid eye tracking information is provided to the neural network model while invalid eye tracking information is not. The input handler may further output the data validity flag. In some embodiments, the input handler may be further configured to facilitate a recurrent neural network. For example, the input handler may include a buffer to store previous timestep data, such as the hidden state of the neural network from the previous timestep, or the eye positions from the previous timestep that is used to compute the features of the recurrent neural network model.

In some embodiments, the eye tracking controller 430 may be configured to provide output handling for the predicted eye tracking information after the predicted eye tracking information is generated using the neural network model. The eye tracking controller 430 may include an output handler that executes the output handling. The output handler ensures that the predicted eye tracking information output from the neural network model does not result in undesirably large changes to the gaze contingent content. For example, the gaze contingent display may include a maximum acceleration, and minimum and maximum distances allowed for the vergence depth in consecutive timesteps. Thus the output handler ensures that the acceleration and the focal plane only change within predefined thresholds. For example, the eye tracking controller 430 may be configured to determine a maximum acceleration, determine a minimum vergence depth and a maximum vergence depth, and determine whether the predicted eye tracking information satisfies the maximum acceleration, the minimum vergence depth, and the maximum vergence depth. In response to determining that the predicted eye tracing information fails to satisfy the maximum acceleration, the minimum vergence depth, or maximum vergence depth, the eye tracking controller 430 may be further configured to update the predicted eye tracking information such that the maximum acceleration, the minimum vergence depth, and the maximum vergence depth are satisfied. For example, a predicted vergence depth that fails to exceed the minimum vergence depth may be set to the minimum vergence depth, and a predicted vergence depth that exceeds the maximum vergence depth may be set to the maximum vergence depth. In another example, if predicted eye positions result in an eye acceleration that exceeds the maximum acceleration, then the predicted eye positions may be adjusted such that the acceleration is at the maximum acceleration. Subsequent to updating the predicted eye tracking information, the predicted eye tracking information may be provided to the console 110. In some embodiments, a maximum standard deviation between eye tracking information and predicted eye tracking information may also be used to adjust the displayed gaze contingent content. In some embodiments, predicted eye tracking information outside of predefined thresholds may be discarded, and the measured eye tracking information for a timestep may be used to generate the gaze contingent content for the timestep rather than the predicted eye tracking information for a subsequent timestep.

A console 110 generates 730 gaze contingent content based on the predicted eye tracking information. The eye tracking unit 160 may be configured to provide the predicted eye tracking information output from the neural network model to the application engine 155 of the console 110. The application engine 155 may be configured to generate display instructions for the gaze contingent content using the predicted eye tracking information.

The console 110 may be configured to render scenes based on the predicted eye tracking information. The rendering may include dynamically changing a distortion model based on where the user is looking, or changing the pixel resolutions at different locations of the display. For example, a higher resolution rendering may be used for display pixels at or near the focus location of the user, while lower resolution rendering may be used for display pixels at the periphery of the user's field of view, or outside of the user's field of view. In another example, objects within gaze contingent content at the vergence depth of the user's eyes may be rendered with higher resolution than objects at different depths within a scene. In some embodiments, display pixels outside the user's view are not rendered, or illuminated, etc. The console 110 may be configured to calculate the user's field of view based on the predicted positions and vergence depth of the eyes. Therefore, the creation of gaze contingent content based on predicted eye tracking information as discussed herein enhances the immersive visual experience of HMDs in real-time, while also providing efficiency improvements that simplify hardware in terms of processing or power consumption requirements.

In another example, properties of optical elements of the optics block 118 may be changed based on predicted vergence depth. The optics block 118 may be configured to direct the gaze contingent content to respective exit pupils of the HMD corresponding to locations of the first eye and the second eye of the user of the HMD. As discussed above, the optics block 118 magnifies image light from the display 115 and thus provides an effective focal length that is longer than the distance from the user's eyes to the display 115. In one example, the position of the optics block 118 may be changed (e.g., brought closer or further from the users eyes) based on the predicted vergence depth such that the effective focal length is equal to the vergence depth (e.g., and larger than the spacing to the electronic display 115).

The HMD 100 displays 740 the gaze contingent content on a display 115 of the HMD 100. The console 110 may be configured to provide the display instructions to the display 115, and the display 115 outputs the gaze contingent content in accordance with the display instructions. Process 700 may be repeated to continuously monitor the user's eyes, generated predicted eye tracking information, and generate gaze contingent content based on the predicted eye tracking information. For example, while the gaze contingent content is displayed, eye tracking controller 430 may be configured to continue generate eye tracking information for the current timestep, generate predicted eye tracking information for a subsequent timestep, provide the predicted eye tracking information to the console to create gaze contingent content for the subsequent timestep, and so forth.

Figure 8:
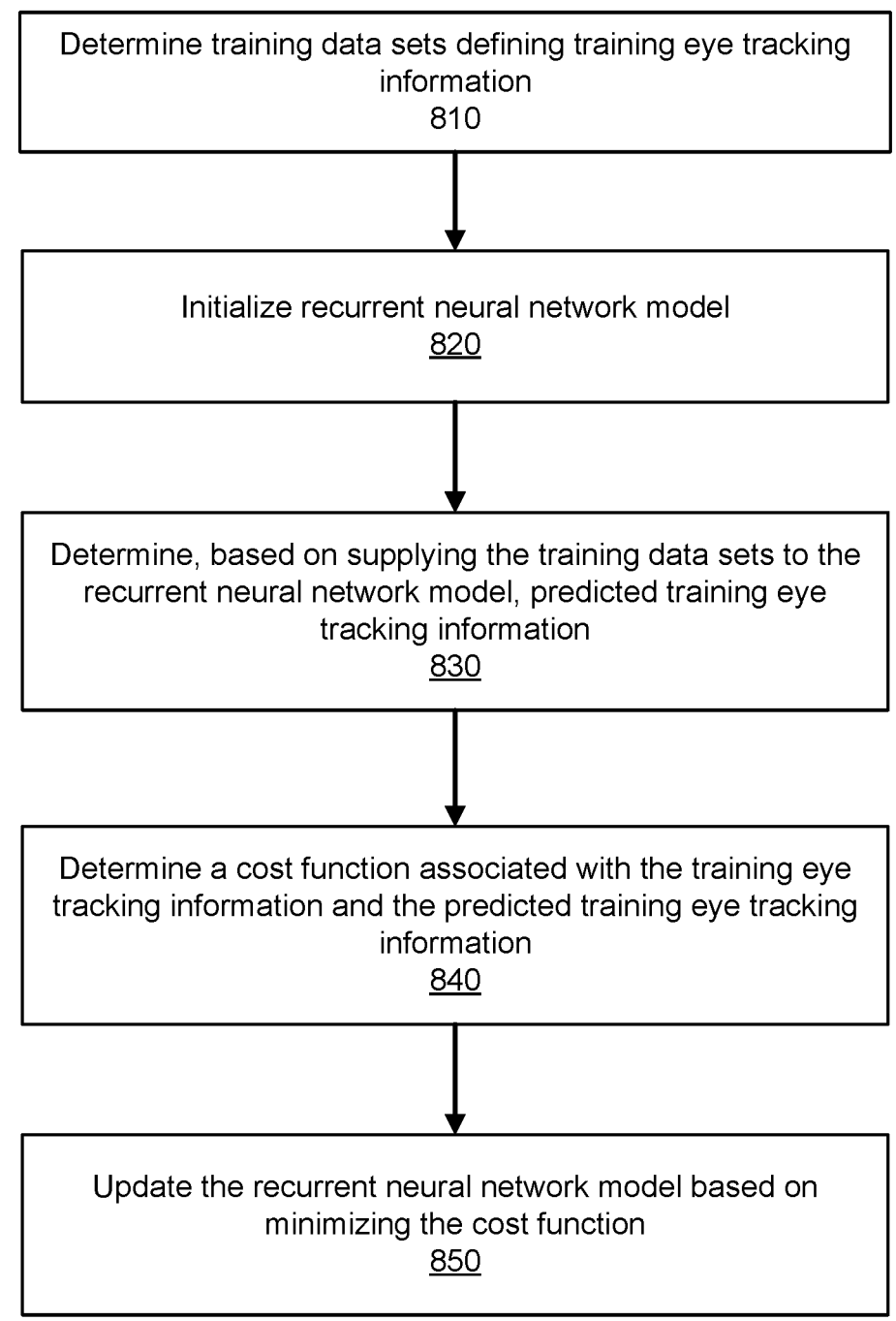
FIG. 8 is a flow chart illustrating a process for generating a recurrent neural network model for predicted eye tracking information, in accordance with some embodiments.

FIG. 8 is a flow chart illustrating a process 800 for generating a recurrent neural network model for predicted eye tracking information, in accordance with some embodiments. Process 800 is described as being performed by the neural network module 615 of the central system 540, which may be configured to implement a recurrent neural network.

In some embodiments, the eye tracking controller 430 of the eye tracking unit 160/400 of the HMD system 100 may be configured to perform process 800. In some embodiments, the recurrent neural network model may be initially trained by the central system 540, and then a subsequent calibration training of the recurrent neural network model may be performed at the HMD system 100 based on using only the user's eye tracking information as training data to update recurrent neural network model for the user.

A neural network module 615 determines 810 training data sets defining training eye tracking information. The neural network module 615 may be configured to receive eye tracking information from the HMD systems 100 and generate the training data sets based on the received eye tracking information. The central system 540 may collect eye tracking information from a large number of HMD systems 100 to train the recurrent neural network model, and then provide the trained neural network model to each HMD system 100 as discussed in greater detail below. The training eye tracking information includes recurrent neural network inputs (e.g., eye positions over time of a saccade) and "ground truth" or expected outputs (e.g., final eye position of the saccade). In some embodiments, the training data sets include sequences of eye tracking information for multiple timesteps, with prior timesteps providing input data and subsequent time steps providing expected outputs.

The eye tracking information may include eye positions of users as a function of time or timesteps. The eye tracking information may be collected from multiple users, thus the neural network module 615 is able to generate a large volume of training data for effectively training the neural network model, and in a manner that can handle variances across users. In another example, the eye tracking information used to generate the training data sets is collected from a single user to generate a custom neural network model for the user, or a trained neural network model may be calibrated or updated for a particular user using a smaller sample of eye tracking information collected from the user than is used to train the neural network model.

The training data sets may include eye tracking information associated with representative eye movements. Such representative eye movements may include saccades in various directions, such as horizontal saccades, vertical saccades, oblique saccades, and/or saccades in depth. A saccade refers to a simultaneous movement of the eyes between fixation points. Although eye movements are complex, saccadic trajectories have certain regularities that are learned by the neural network using the training data. In particular, the size of a saccade (e.g., distance from start eye position to end eye position) is closely related to the maximum velocity of that saccade. Thus there is sufficient regularity in saccadic eye movements to predict the eye position into the future for durations that are on the order of half of the duration of a saccade. As saccades have durations roughly between 40 and 100 ms, eye position on the order of 20 ms into the future may be predicted. In some embodiments, a timestep duration may be defined based on how far into the future that predicted eye tracking information for a saccade can be accurately predicted based on input eye tracking information of the current timestep (e.g., 20 ms per timestep). Saccades typically range in duration from 10 ms to 100 ms and from 2 to 30 degrees in amplitude for the distance the eye travels during the movement.

Other types of representative eye movements that may be included in the training data include fixational eye movements, glissades, smooth pursuit eye movements, vestibular-ocular reflex (VOR) eye movements, eye movements according to Herring's Law of Equal Innervation, eye movements according to Donder/Listing's law, eye movements in response to convergence stimuli, and/or asymmetric vergence saccades.

In some embodiments, the HMD system 100 may be configured to facilitate the collection of representative eye movements. For example, the console 110 may execute an application that displays data collection content, such as moving scenes or objects that tend to induce the representative eye movements. The console may generate eye tracking information for the training data sets that capture how the user's eyes interact with the moving scenes or objects in a free viewing mode. In some embodiments, using a dynamic focus mode, fixation targets may be presented in a random order at different vergence depths and eye position (as defined by angles). For example, the fixation targets may include a set of all combinations for vergence depth=0.1, 0.5, 1, 1.5, 2.0, 2.5, 3.0, 3.5, 4.0, and 4.5 diopters; and positions=0, 5, 10, 15, 20 degrees off axis, and $$\frac{2\pi}{8} * (0, 1, \ldots 7)$$

rotationally. Sets of eye tracking information may be generated in varifocal mode, with varifocal off, or both. In some embodiments, moving scenes or fixation targets are repeated (e.g., three times) during the collection of representative eye movements to generate 800 ms chunks of (e.g., free viewing) data. Time intervals with less than 5 deg of movement in 800 ms may be removed from the training data.

In some embodiments, the eye tracking information of the training data sets may be updated to model for data loss. The training eye tracking information of the training data sets may include data loss intervals or timesteps. The neural network module 615 may be configured randomly insert data loss intervals into the (e.g., valid) eye tracking information captured by HMD systems 100. The ground truth eye tracking information is unchanged. When the recurrent neural network model is trained using training data sets including data loss intervals, the recurrent neural network model can accurately generate predicted eye tracking information even if there is some data loss in the input eye tracking information.

The neural network module 615 initializes 820 a recurrent neural network (RNN) model. When a sequence prediction task gets complicated enough, it is difficult to create a hand-engineered solution. The recurrent neural network provides various advantages with respect to forward predicting eye movements because the recurrent neural network approach requires less hand-engineering, detects different eye movements implicitly instead of by explicit programming, generalizes to unrestricted real-world situations, and keeps track of the duration of a saccade and determines eye velocity more accurately than a constant velocity model.

The RNN provides machine learning for temporal sequences. Given two temporal sequences, $X_t$ and $Y_t$, the recurrent neural network attempts to predict $Y_t$ from $X_t$. An algorithm that has a hidden state $H_t$ is used to facilitate this prediction. $X_t$, and $H_t$ are related by Equations 4 and 5:

$$H_t = A(H_{t-1}, X_t) \qquad (4)$$

$$O_t = B(H_t) \qquad (5)$$

where $X_t$ is the input sequence (e.g., eye tracking information), $H_t$ is the hidden state, and $O_t$ is the prediction of the output sequence (e.g., predicted eye tracking information). A and B are functions with some parameters that relate the inputs, hidden state, and outputs. In particular, A and B may be chosen from parameterized set of functions whose parameters θ can be learned from training data.

A cost function C(θ) is defined as a differentiable function of the parameters θ. A good model corresponds to a θ that makes the cost function small, or minimizes the cost function. The optimal θ may be determined by using stochastic gradient descent on the cost function C.

The recurrent neural network parameterizes a class of probability distributions, and parameters can be chosen that maximize the likelihood of the data fitting under that class of models. The RNN prediction may include a mean and standard deviation for each dimension of the output.

The parameterization may include generating an output vector $v_t$ for an RNN cell output $O_t$ as shown in Equation 6:

$$v_t = W_{out} O_t + b_{out} \qquad (6)$$

where $W_{out}$ is a matrix and $b_{out}$ is a bias. The output is then split into components that refer to the mean and standard deviation of the prediction. The mean component is shown in Equation 7:

$$\mu = v_t[0; d] \qquad (7)$$

where d is the output dimension. The standard deviation component is shown in Equation 8:

$$\sigma_t = e^{vt[d;2d]} \quad (8)$$

where d is the output dimension. In Equation 6, the exponential assures that the standard deviations are positive.

Next a probabilistic model may be generated to construct the cost function $C(\theta)$ based on Equations 9 and 10:

$$\overline{\theta} = \text{argmax}_\theta p(Y|X, \theta) \quad (9)$$

$$p(Y_T, \ldots Y_1|X_T, \ldots X_1, \theta) = \prod_{t=1}^{T} p(Y_t|X_t, X_{t-1}, \ldots X_1, \theta). \quad (10)$$

The RNN outputs a Gaussian distribution with a mean and standard deviation for each dimension of the output. The parameters $\theta$ of the model should be chosen to maximize the likelihood of data fit under the model. To convert the product in Equation 8 to a sum to minimize, the negative log of the probability may be used as shown by Equations 11 and 12:

$$p(Y_T|\mu_t \sigma_t) = \frac{1}{\sigma\sqrt{2\pi}} e^{\left[-\frac{1}{2}\left(\frac{Y-\mu}{\sigma}\right)^2\right]} \quad (11)$$

$$-\log p(Y_T|\mu_t \sigma_t) = \frac{1}{2} * \left(\frac{Y-\mu}{\sigma}\right)^2 + \log \sigma + C \quad (12)$$

where Y is the target output, and $\mu$ and $\sigma$ represent the outputs of the RNN, The cost function is then determined based on summing Equation 10 over time and the dimensions of the output as shown in Equation 13:

$$\hat{\theta} = \text{argmax}_\theta \sum_{t=1}^{T} \frac{1}{2} * \left(\frac{Y_T - \mu_t}{\sigma_t}\right)^2 + \log \sigma_t. \quad (13)$$

Initializing the neural network model may include initializing a zero state of the RRN. The matrices in the model may be initialized based on the Xavier rule with biases set to zero. In particular, weights may be initialized using Xavier initialization by choosing from a normal distribution shown by Equation 14:

$$\sigma^2 = \frac{6}{\text{in} + \text{out}} \quad (14)$$

The inputs and outputs of the RNN are normalized to have a standard deviation of one and a mean of zero. Normalization is used to control saturating non-linearity for the input and output.

In some embodiments, differences in the RNN input and output may be directly predicted. In particular, for the input and output, preprocessing may be performed so that the sequences that are regressed are defined by Equations 15 and 16:

$$\tilde{X}_t = \text{concat}(X_t, X_t - X_{t-1}) \quad (15)$$

$$\tilde{Y}_t = Y_t - f(X_t) \quad (16)$$

where $Y_t = f(X_{t+\Delta t})$.

In some embodiments, preprocessing may be performed so that the sequences that are regressed are defined by Equations 17 and 18:

$$\tilde{X}_t = \frac{[X_t, X_t - X_{t-1}]}{\text{inscale}} \quad (17)$$

$$\tilde{Y}_t = \frac{(Y_t - l(X_t))}{\text{outscale}} \quad (18)$$

where $f(x) = x$ for eye position prediction or $f(x)$ is the function that takes eye position and computes vergence depth (e.g., in diopters), and inscale and outscale are vectors that make $\tilde{X}_t$ and $\tilde{Y}_t$ have standard deviation of 1 on the training data. The preprocessing on the training data including differencing and normalization reduces the dynamic range of the training data to reduce nonlinearity saturation for the RNN model (e.g., for eye movements that are large). The differenced and normalized training data are then used as input and output for training the RNN.

The neural network module 616 may determines 830, based on applying the training data sets to the neural network model, predicted training eye tracking information. The RNN may use stacked long short-term memory (LSTM) architecture. The LSTM architecture creates a hidden state that the RNN model can choose to preserve or destroy over time as given by Equations 19-24:

$$c_{t-1}, m_{t-1} = H_{t-1} \quad (19)$$

$$i_t, j_t, f_t, o_t = \text{split}(W * \text{concat}(m_{t-1}, X_t) + b) \quad (20)$$

$$c_t = c_{t-1} * \sigma(f_t + 1) + \sigma(i_t) h(j) \quad (21)$$

$$m_t = \sigma(o_t) * h(c_t) \quad (22)$$

$$H_t = (c_t, m_t) \quad (23)$$

$$O_t = m_t \quad (24)$$

where W is a matrix, b is a bias vector, $h(x) = \tanh(x)$ is an activation function, and $\sigma(x)$ is a sigmoid function. With respect to the sigmoid function, $f_t + 1$ is used so that using the initialization scheme, the RNN is biased not to forget at the start of training.

For the main training loop (t=1 to t=T), the training data including inputs and outputs are provided to the RNN. The RNN cells feed the previous hidden state of the RNN and the normalized input to k layers of LSTM cells (e.g., k=2 or 3).

In some embodiments, the RNN cells may have composability. For an RNN cell with input I, state S, and output O, if the dimension of the output of one RNN cell matches the dimension of the input of a second RNN cell, the two RNN cells may be stacked and considered as a single large RNN cell. For example, suppose the RNN cells are defined as Ci for i=1,2. Then the composite RNN cell may be defined by Equations 25:

$$I' = I_1 \; S = [S_1, S_2] \; O' = O_1 \quad (25).$$

These properties may be leveraged by stacking three LSTM cells before the output of the RNN.

The output of the final LSTM cell represents the predicted eye tracking information, or calculated differences between the predicted eye tracking information and the ground truth outputs of the training data (e.g., $\mu$ and $\sigma$). The output of the final LSTM cell may then be multiplied by a matrix $W_{out}$ and a bias $b_{out}$ may be added as shown above in Equation 3.

Next, the predicted eye tracking information output may be split into a mean $\mu_t$ component and a standard deviation $\sigma_t$ component as shown above in Equations 5 and 6 respectively.

At the end of the forward pass, the mean μt component and a standard deviation $\sigma_t$ component may be unnormalized as shown in Equations 26 and 27:

$$\mu_t = \tilde{\mu}_t * \text{outscale} + f(x_t) \tag{26}$$

$$\sigma_t = \tilde{\sigma}_t * \text{outscale} \tag{27}$$

The neural network module 616 determines 840 a cost function associated with the training eye tracking information and the predicted training eye tracking information. The training eye tracking information, as discussed above, includes ground truth outputs of eye tracking information that follow prior input eye tracking information. The predicted training eye tracking information refers to the output of the RNN generated using the input eye tracking information of the training data. Differences between the outputs of the training eye tracking information and the predicted training eye tracking information may be represented by mean μ and standard deviation σ. The cost function is also discussed above, with an example cost function shown in Equation 13 (reproduced below):

$$\theta = \mathrm{argmax}_\theta \sum_{t=1}^{T} \frac{1}{2} * \left(\frac{Y_T - \mu_t}{\sigma_t}\right)^2 + \log \sigma_t. \tag{13}$$

The RNN model is trained using back propagation through time. The total cost function may be defined by Equation 28:

$$\sum_{t=1}^{T} l\left(\frac{\tilde{Y}_t - \tilde{\mu}_t}{\tilde{\sigma}_t}\right) + \frac{1}{2}\log\left(\frac{\tilde{\sigma}_t}{\tilde{\sigma}_0}\right) * I(\tilde{\sigma}_t > \tilde{\sigma}_0) \tag{28}$$

where $$\tilde{\sigma}_0 = \frac{\sigma_0}{mean(outscale)}$$

and $\sigma_0$ is a parameter of the model. Furthermore, l(x) is defined by Equation 29:

$$l(x) = \begin{cases} 0.5\ x^2 & \text{if } |x| < a \\ a\ |x| - 0.5 a^2 & \text{if } |x| > a \end{cases} \tag{29}$$

where a=5.

Next, the cost function may be adjusted with respect to σ as shown in Equation 30:

$$\log(\sigma) = \begin{cases} \frac{1}{2}\log\left(\frac{\sigma}{\sigma_0}\right) & \text{if } \sigma > \sigma_0 \\ 0 & \text{if } \sigma < \sigma_0 \end{cases} \tag{30}$$

This adjustment of the cost function prevents overfitting to noisy data. Here, $\sigma_0$ is set to be about half of the noise of the data. Equation 26 can be interpreted as adding a prior σ as shown by Equation 31.

$$-\log(p(\sigma)) = \begin{cases} -\frac{1}{2}\log(\sigma_0) & \text{if } \sigma > \sigma_0 \\ -\log(\sigma) & \text{if } \sigma < \sigma_0 \end{cases} \tag{31}$$

The neural network module 616 updates 850 the recurrent neural network model based on minimizing the cost function. The neural network module 616 may compute the cost function and then take the derivative of the cost function with respect to the parameters. Then, the values of the model parameters may be updated, such as by using the ADAM rule.

Figure 9:
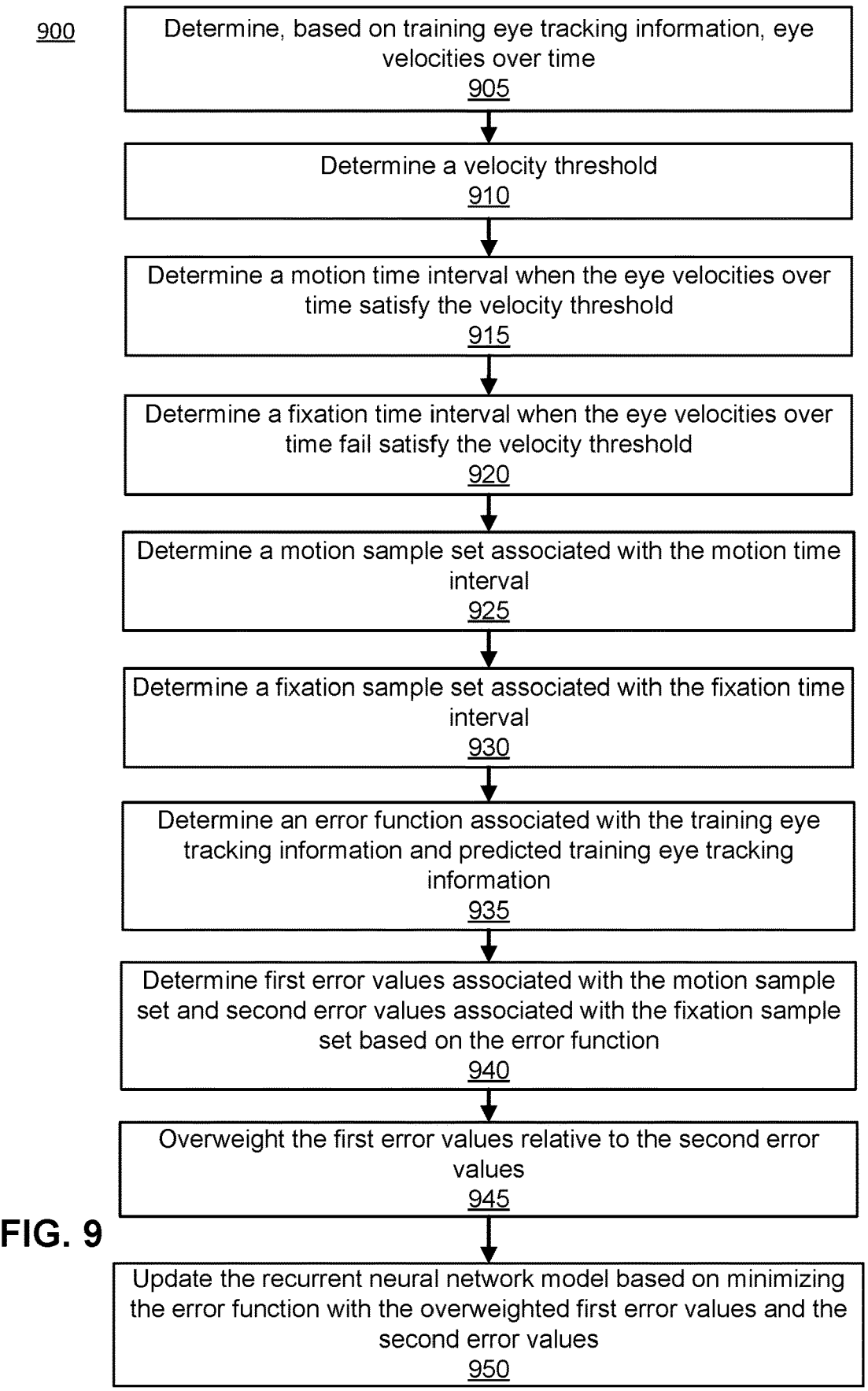
FIG. 9 is a flow chart illustrating a process for generating a recurrent neural network model based on eye velocities, in accordance with some embodiments.

FIG. 9 is a flow chart illustrating a process 900 for generating a recurrent neural network model based on eye velocities, in accordance with some embodiments. Minimizing the cost function may include calculating differences between ground truth eye tracking information outputs of the training data sets and predicted eye tracking information. The differences may be represented by an error function. In some embodiments, a root mean squared (RMS) error function may be used.

However, the use of RMSE as a metric is dependent on the data. For example, if a large percent of the data consists of fixations, then the RMSE will be artificially reduced. Process 900 is directed to this issue by using modified RMSE functions based on eye velocity. In particular, the RMSE function may give more weight to errors generated from higher velocity regions of eye tracking information signal than errors generated from lower velocity regions. As such, the predictive RNN model is more focused on the non-trivial (e.g., non-fixation) portions of the eye tracking information signal. In some embodiments, process 900 may be performed at 840 or 850 of process 800 to update the recurrent neural network model.

A neural network module 616 determines 905, based on eye tracking information, eye velocities over time. The eye tracking information may include the training eye tracking information of a training data set. The eye velocities over time may be determined as a rate of changes to eye position over time, and may be derived from eye tracking information defining eye positions over time. In some embodiments, eye velocities may be an additional part of the eye tracking information generated by HMD system 100, and are not recalculated by the recurrent neural network module 616.

Figure 10:
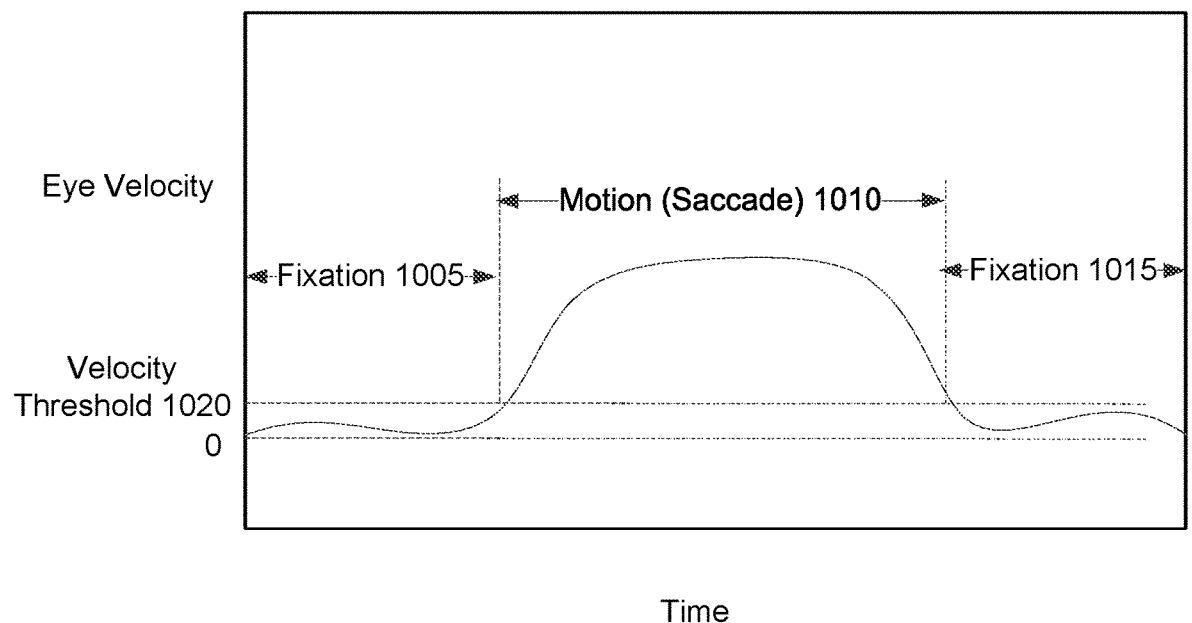
FIG. 10 is a diagram of eye velocities during a saccade.

As discussed above, a saccade is an eye movement type of particular interest. FIG. 10 is a diagram of eye velocities over time during a saccade. As shown, the eye velocities define a fixation time interval 1005, a subsequent motion (saccade) time interval 1010, and a subsequent fixation time interval 1015. A saccade includes (e.g., fast) simultaneous movement of the eyes between fixation points. Predicting final eye positions at the end of a saccade while the saccade is being detected reduces latency between eye tracking detection and the generation of corresponding gaze contingent content.

Human eye studies indicate that the size of a saccade (e.g., distance from start eye positions to end eye positions) is closely related to the maximum velocity of that saccade. Therefore, eye velocities can be used as a predictive feature of the RNN model to output predicted eye positions or predicted vergence depth.

The neural network module 616 determines 910 a velocity threshold. The occurrence of a saccade (or other motion of interest) may be defined by a velocity threshold 1020, where eye velocities above the threshold are within a motion time interval and eye velocities below the threshold are within a fixation time interval. Thus a measured eye velocity above the velocity threshold indicates a potential occurrence of a saccade.

The neural network module 616 determines 915 a motion time interval when the eye velocities over time satisfy the velocity threshold. With reference to FIG. 10, the motion time interval 1010 may be determined based on the measured eye velocity satisfying (e.g., exceeding) the velocity threshold 1020.

The neural network module 616 determines 920 a fixation time interval when the eye velocities over time fail to satisfy the velocity threshold. With reference to FIG. 10, the fixation time interval 1005 and/or 1015 may be determined based on the measured eye velocity failing to satisfy (e.g., failing to exceed) the velocity threshold 1020.

The neural network module 616 determines 925 a motion sample set associated with the motion time interval. The motion sample set refers to eye tracking information captured within the motion time interval. The motion sample set may include eye positions and/or vergence depths determined within the motion time interval 1010.

The neural network module 616 determines 930 a fixation sample set associated with the fixation time interval. The fixation sample set refers to eye tracking information captured within the fixation time interval. The motion sample set may include eye positions and/or vergence depths determined within the fixation time interval 1005 and/or 1015.

The neural network module 616 determines 935 an error function associated with the training eye tracking information and predicted training eye tracking information generated from the recurrent neural network model. The error function or loss function penalizes differences between the predicted eye tracking information and ground truth eye tracking information. The error function may include the RMSE between the (e.g., ground truth output) training eye tracking information and predicted training eye tracking information generated from the recurrent neural network model, as shown by Equation 32:

$$\text{RMSE} = \sqrt{(Y-\hat{Y})^2} \tag{32}$$

The neural network module 616 determines 940 first error values associated with the motion sample set and second error values associated with the fixation sample set based on the error function. The error values may be determined based on supplying the predicted eye tracking information and the ground truth eye tracking information to the error function. The first error values associated with the motion sample set refer to error values calculated for predicted eye tracking information during the motion time interval when eye velocities satisfy the velocity threshold. The second error values associated with the fixation sample set refer to error values calculated for predicted eye tracking information during the fixation time interval when eye velocities fail to satisfy the eye velocity threshold.

The neural network module 616 overweights 945 the first error values relative to the second error values. For example, a constant (e.g., 9) or other weighting factor may be applied to the first error values such that the error function penalizes prediction error more for motion time intervals than fixation time intervals. The second error values are not weighted (e.g., or may be weighted less than the first error values) such that the error function penalizes prediction error more for motion time intervals than fixation time intervals. In some embodiments, errors toward the end of the saccade of motion period 1010 may be weighted more heavily than errors toward the start of the saccade of the motion period 1010. Prediction errors for different periods of a saccade may be weighted differently because the user's visual sensitivity varies during the saccade. In particular, users typically have more visual sensitivity toward the end of a saccade.

The neural network module 616 updates 950 the recurrent neural network model based on minimizing the error function with the overweighted first error values and the second error values. The values of the RNN model parameters may be updated, such as by using the RMSProp rule.

In some embodiments, the trained RNN model may be compared with various baseline models, such as a constant predictor or a linear predictor, to assess the quality of the RNN model. Using a constant predictor, for an input sequence $X_t$, the target sequence may be defined by $Y_t = f(X_{t+\Delta t})$ where f is a known function. For the eye position prediction, f(x) and for the vergence depth prediction, f is a function that receives eye positions and computes the vergence depth. The current eye position may be used to approximate future eye positions as shown in Equation 33:

$$\hat{Y}_t = f(X_t) \tag{33}$$

Equation 33 may be used as a baseline for evaluating the effectiveness of the RNN model.

Using a linear predictor includes performing a linear regression that linearly combines input from previous timesteps, such as shown by Equation 34:

$$\hat{Y}_t = W^0 X_t + W^1 X_{t-1} + \ldots W^{(k-1)} X_{t-k+1} \tag{34}$$

where $W^i$ are matrices of dimension number of inputs by number of outputs. The model parameters are chosen to minimize the squared error $(Y-\hat{Y})^2$. This can be made into a simple linear regression problem by concatenating the past k inputs for each timestep into a vector.

Additional Configuration Considerations

The foregoing descriptions of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
    a head mounted display (HMD) comprising:
        an electronic display that outputs gaze contingent content in accordance with display instructions;
        a plurality of cameras configured to capture images of a first eye of a user of the HMD and a second eye of a user of the HMD; and
        an optics block configured to direct the gaze contingent content to respective exit pupils of the HMD corresponding to locations of the first eye and the second eye of the user of the HMD;
    an eye tracking controller configured to:
        determine eye tracking information defining positions of a first eye and a second eye of a user using the captured images;
        determine, based on the eye tracking information, velocities of the first eye and the second eye defining changes in the positions of the first eye and the second eye over time;
        determine, based on the eye tracking information, a vergence depth of the first and second eyes; and
        determine, based on supplying the eye tracking information, the velocities of the first eye and the second eye, and the vergence depth of the first and second eyes to a neural network model, predicted eye tracking information defining predicted positions of the first eye and the second eye, wherein the neural network model defines an algorithmic relationship between the predicted eye tracking information and (1) the eye tracking information, (2) the velocities of the first and second eyes, and (3) the vergence depth of the first and second eyes; and
    a console configured to:
        generate the display instructions using the predicted eye tracking information, the display instructions including content for presentation by the display; and
        provide the display instructions to the HMD.

2. The system of claim 1, wherein the neural network model includes a recurrent neural network model.

3. The system of claim 1, wherein the neural network model defines an algorithmic relationship between the eye tracking information at first timesteps and the predicted eye tracking information at a second timestep subsequent to the first timesteps.

4. The system of claim 1, wherein the eye tracking controller is further configured to determine an error value associated with the predicted eye tracking information.

5. The system of claim 1, wherein the eye tracking controller is further configured to:
    determine training data sets defining training eye tracking information including inputs and outputs of the neural network model;
    determine, based on supplying the inputs of the training data sets to the neural network model, predicted training eye tracking information;
    determine a cost function associated with the outputs of the training eye tracking information and the predicted training eye tracking information; and
    update the neural network model based on minimizing the cost function.

6. The system of claim 5, wherein the training eye tracking information of the training data sets include data loss intervals.

7. The system of claim 1, wherein the eye tracking controller is further configured to:
    determine, based on the eye tracking information, eye velocities over time;
    determine a velocity threshold;
    determine a motion time interval when the eye velocities over time satisfy the velocity threshold, the motion time interval defining an end period of a saccade;
    determine a fixation time interval when the eye velocities over time fail to satisfy the velocity threshold, the fixation time interval defining an initial period prior to the end period;
    determine a motion sample set including first eye tracking information and first predicted eye tracking information associated with the motion time interval;
    determine a fixation sample set including second eye tracking information and second predicted eye tracking information associated with the fixation time interval;
    determine first error values associated with the motion sample set using an error function;
    determine second error values associated with the fixation sample set using the error function;
    overweight the first error values relative to second error value; and
    update the neural network model based on minimizing the error function using the overweighted first error values and the second error values.

8. The system of claim 7, wherein the eye tracking controller is further configured to:
    determine an earlier portion and a later portion of a saccade within the motion time interval; and
    overweight a first portion of the first error values associated with the earlier portion of the saccade relative to a second portion of the first error values associated with the later portion of the saccade.

9. The system of claim 1, wherein:
the eye tracking controller is further configured to determine the predicted eye tracking information based on supplying at least one of user head motion, user pupil size, or eye position estimation uncertainty to the neural network model; and
the neural network model defines an algorithmic relationship between the predicted eye tracking information and the least one of user head motion, user pupil size, or eye position estimation uncertainty.

10. The system of claim 1, wherein the eye tracking controller is further configured to determine a data validity flag associated with the eye tracking information prior to applying the eye tracking information to the neural network model.

11. The system of claim 1, wherein the eye tracking controller is further configured to store eye tracking information from a prior timestep and a hidden state of the neural network model from the prior timestep to facilitate determination of the predicted eye tracking information.

12. The system of claim 1, wherein the eye tracking controller is further configured to:
determine a maximum acceleration;
determine a minimum vergence depth and a maximum vergence depth;
determine whether the predicted eye tracking information satisfies the maximum acceleration, the minimum vergence depth, and the maximum vergence depth;
in response to determining that the predicted eye tracking information fails to satisfy the maximum acceleration, the minimum vergence depth, or maximum vergence depth, update the predicted eye tracking information such that the maximum acceleration, the minimum vergence depth, and the maximum vergence depth are satisfied; and
provide the predicted eye tracking information to the console subsequent to updating the predicted eye tracking information.

13. The system of claim 1, wherein:
the plurality of cameras includes a first camera configured to capture first image data frames of the first eye and a second camera configured to capture second image data frames of the second eye;
the first camera and the second camera operate using asynchronous threads; and
the eye tracking controller is further configured to synchronize the first image data frames and the second image data frames based on timestamps.

14. The system of claim 1, wherein the eye tracking controller is located in a front rigid body of the HMD.

15. A system comprising:
a head mounted display (HMD) comprising:
an electronic display that outputs gaze contingent content in accordance with display instructions;
a plurality of cameras configured to capture images of a first eye of a user of the HMD and a second eye of a user of the HMD; and
an optics block configured to direct the gaze contingent content to respective exit pupils of the HMD corresponding to locations of the first eye and the second eye of the user of the HMD;
a console comprising:
an eye tracking controller configured to:
determine eye tracking information defining positions of a first eye and a second eye of a user using the captured images;
determine, based on the eye tracking information, velocities of the first eye and the second eye defining changes in the positions of the first eye and the second eye over time;
determine, based on the eye tracking information, a vergence depth of the first and second eyes; and
determine, based on supplying the eye tracking information, the velocities of the first eye and the second eye, and the vergence depth of the first and second eyes to a neural network model, predicted eye tracking information defining predicted positions of the first eye and the second eye, wherein the neural network model defines an algorithmic relationship between the predicted eye tracking information and (1) the eye tracking information, (2) the velocities of the first and second eyes, and (3) the vergence depth of the first and second eyes; and
a rendering module configured to:
generate the display instructions using the predicted eye tracking information, the display instructions including content for presentation by the display; and
provide the display instructions to the HMD.

* * * * *